United States Patent
Fujieda et al.

[11] Patent Number: 6,148,791
[45] Date of Patent: Nov. 21, 2000

[54] APPARATUS FOR AND METHOD OF CONTROLLING INTERNAL COMBUSTION ENGINE

[75] Inventors: Mamoru Fujieda, Ibaraki-ken, Japan; Toshiharu Nogi, Novi, Mich.; Yoshishige Oyama, Hitachinaka, Japan; Minoru Ohsuga, Hitachinaka, Japan; Takuya Shiraishi, Hitachinaka, Japan

[73] Assignee: Hitachi, Ltd., Tokyo, Japan

[21] Appl. No.: 09/236,321

[22] Filed: Jan. 25, 1999

Related U.S. Application Data

[62] Division of application No. 08/850,012, May 1, 1997, Pat. No. 5,875,761, which is a division of application No. 08/362,878, Dec. 23, 1994, Pat. No. 5,666,916.

[30] Foreign Application Priority Data

Dec. 28, 1993  [JP]  Japan ..................................... 5-334895
Dec. 28, 1993  [JP]  Japan ..................................... 5-334928

[51] Int. Cl.$^7$ ............................. F02D 13/02; F02D 11/10; F02D 1/34
[52] U.S. Cl. ................... 123/295; 123/90.11; 123/90.17; 123/399
[58] Field of Search ............................. 123/90.11, 90.15, 123/90.16, 90.17, 90.18, 295, 299, 300, 305, 399

[56] References Cited

U.S. PATENT DOCUMENTS

| | | | |
|---|---|---|---|
| 3,682,152 | 8/1972 | Muller-Berner | 123/90.11 |
| 3,918,543 | 11/1975 | Halem | 477/174 |
| 4,355,550 | 10/1982 | Will et al. | 477/107 |
| 4,376,369 | 3/1983 | Horikoshi et al. | 60/290 X |
| 4,574,588 | 3/1986 | Hayama et al. | 60/285 X |
| 4,724,723 | 2/1988 | Lockhart et al. | 477/109 X |
| 4,771,752 | 9/1988 | Nishimura et al. | 123/399 X |
| 5,012,695 | 5/1991 | Kyohzuka et al. | 477/102 |
| 5,021,956 | 6/1991 | Yoshimura et al. | 701/105 |
| 5,022,357 | 6/1991 | Kawamura | 123/90.11 |
| 5,046,466 | 9/1991 | Lipski | 123/310 |
| 5,050,543 | 9/1991 | Kawamura | 123/90.11 |
| 5,072,630 | 12/1991 | Kikuchi et al. | 477/109 X |
| 5,080,055 | 1/1992 | Komatsu et al. | 123/90.11 X |
| 5,150,635 | 9/1992 | Minowa et al. | 477/107 X |
| 5,150,680 | 9/1992 | Nishimura | 123/399 |
| 5,201,296 | 4/1993 | Wunning et al. | 123/90.11 X |
| 5,284,116 | 2/1994 | Richeson, Jr. | 123/90.11 X |
| 5,325,828 | 7/1994 | Yamaguchi et al. | 123/585 X |
| 5,470,290 | 11/1995 | Minowa et al. | 477/115 |

FOREIGN PATENT DOCUMENTS

| | | |
|---|---|---|
| 0451462 | 10/1991 | European Pat. Off. . |
| 0547817 | 6/1993 | European Pat. Off. . |
| 2196152 | 8/1990 | Japan . |
| 4-183945 | 6/1992 | Japan ..................................... 123/295 |

*Primary Examiner*—Tony M. Argenbright
*Attorney, Agent, or Firm*—Antonelli, Terry, Stout & Kraus, LLP

[57] ABSTRACT

The engine disclosed features an engine cylinder provided with an air intake valve, an injector having a fuel injection port which is directed towards an interior of the engine cylinder, and a control unit which is connected to the air intake valve and to the injector, the control unit effecting changes in the air intake amount by controlling the degree of opening of the air intake valve, and, also, controls the air/fuel ratio by changing the amount of fuel supplied by the injector. The engine also has an exhaust valve in the engine cylinder such that the control unit controls the intake valve and the exhaust valve so that an opening period of the intake valve is overlapped with an opening period of the exhaust valve at least when the opening period of the intake valve is maximum. The period of the overlap is longer when a relatively large amount of air is required than when a relatively small amount of air is required. According to such a scheme, the amount of the air can be changed by the lift of the intake valve. By changing the lift, the overlap with an exhaust valve is also changed. During the high-output or power operation, the period of overlap between the exhaust valve and the intake valve is made longer. When engine torque decreases to a level lower than the target engine torque, the air amount is adjusted by the cam or the throttle valve.

18 Claims, 25 Drawing Sheets

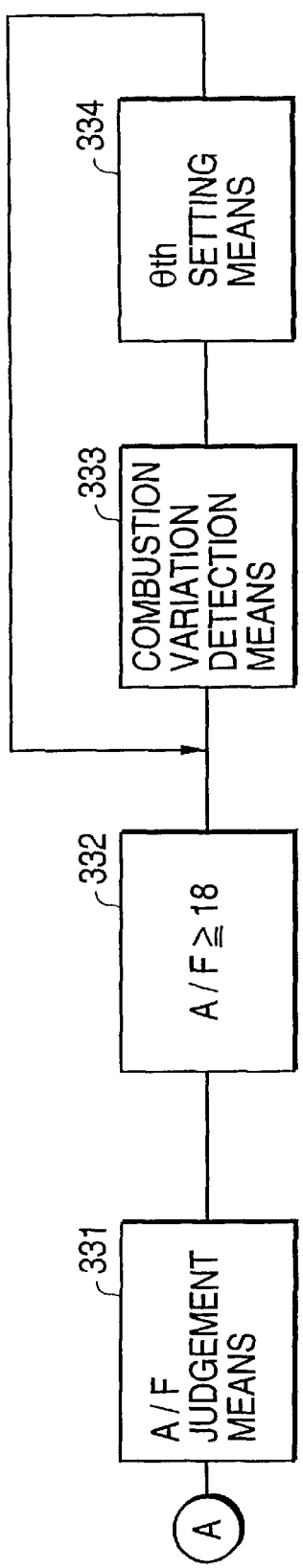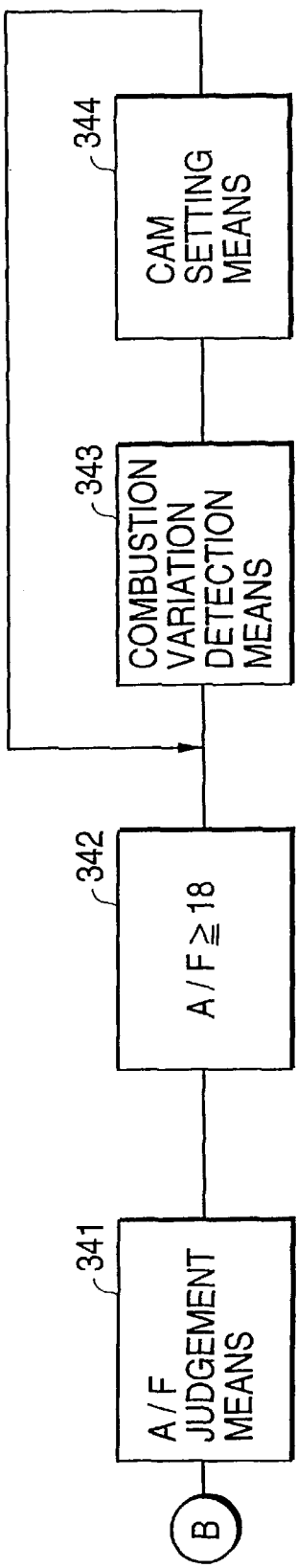

APPARATUS FOR AND METHOD OF CONTROLLING INTERNAL COMBUSTION ENGINE

CROSS-REFERENCE TO RELATED APPLICATIONS

This application is a divisional of application Ser. No. 08/850,012, filed May 1, 1997, now U.S. Pat. No. 5,875,761, which, in turn, was a divisional of application Ser. No. 08/362,878, filed Dec. 23, 1994, now U.S. Pat. No. 5,666,916, the entire disclosures of which are hereby incorporated by reference.

BACKGROUND OF THE INVENTION

1. Field of the Invention

This invention relates generally to a spark-ignition internal combustion engine, and more particularly to an apparatus for and a method of controlling a spark-ignition internal combustion engine of the type in which fuel is injected directly into a cylinder.

2. Related Art

There is known a conventional system (Japanese Patent Unexamined Publication No. 2-153257) in which fuel is injected directly into a cylinder by use of the air pressure. A conventional diesel engine utilizes a stratified combustion, and therefore the maximum output or power is low although the fuel consumption under a partial load is enhanced. On the other hand, a conventional gasoline engine has a drawback that although the maximum output or power is high because of a premixture combustion, the fuel consumption under a partial load is worsened because of a pumping loss.

SUMMARY OF THE INVENTION

It is an object of this invention to provide an apparatus for and a method of controlling an internal combustion engine, in which under a partial load, a pumping loss is eliminated by a stratified combustion, thereby enhancing the fuel consumption, and during a maximum-output operation, the output or power is increased by a premixture combustion, and an engine torque is controlled to improve the operability (drivability), the fuel consumption and an exhaust cleaning effect.

In order to overcome the above problem of the prior art, under a partial load, an ignition source is provided in the vicinity of a fuel injection valve, and after the fuel is injected, the mixture is ignited, and a resulting flame is caused by a spray of the fuel to spread into a cylinder, thereby effecting a stratified combustion. On the other hand, when the load increases, so that soot and so on are produced in the stratified combustion, the fuel injection is effected a plurality of times in a divided manner, and a premixture is produced within the cylinder by the former-half injection, and a flame, produced by the latter-half injection, is injected into the cylinder to burn this premixture. Thus, the premixture is burned in a short period of time. When changing the gear ratio of a transmission, the amount of the fuel is changed so that a step will not develop in a torque.

When the amount of injection of the fuel is small as in a partial-load operation, the initiation of the injection and the ignition timing can be relatively close to each other, and therefore the fuel is not so much spread within the cylinder, and the combustion (stratified combustion) takes place in a relatively narrow range. In accordance with the increase of the load, the initiation of the injection is made earlier, so that the range of formation of the mixture (premixture) increases, and a premixture combustion takes place, thereby increasing the produced torque.

In accordance with the drive torque, the gear ratio of the transmission is selected, and if the drive torque need to be further increased, the gear ratio of the transmission is increased. When changing the gear ratio, the fuel injection amount is controlled so that the drive torque will not be varied. The fuel is injected into the combustion chamber of the engine by a fuel injection valve having a port (opening) therein, and therefore the fuel will not deposit on an intake manifold and other portions, and the speed of inflow of the fuel is high, and the engine torque can be controlled with a good response. The air/fuel ratio can be set to a large value, and therefore a throttle valve opening degree can be increased to reduce a pumping loss, thereby enhancing a fuel consumption. Moreover, since the air/fuel ratio can be increased, the amount of CO and HC in the exhaust gas can be reduced.

BRIEF DESCRIPTION OF THE DRAWINGS

FIG. 20 is a block diagram of a control system according to a sixth embodiment of the invention;

FIG. 21 is a block diagram of the control system, according to an embodiment of the invention, similar to the system of FIG. 20;

DESCRIPTION OF THE PREFERRED EMBODIMENTS

Figure 1:
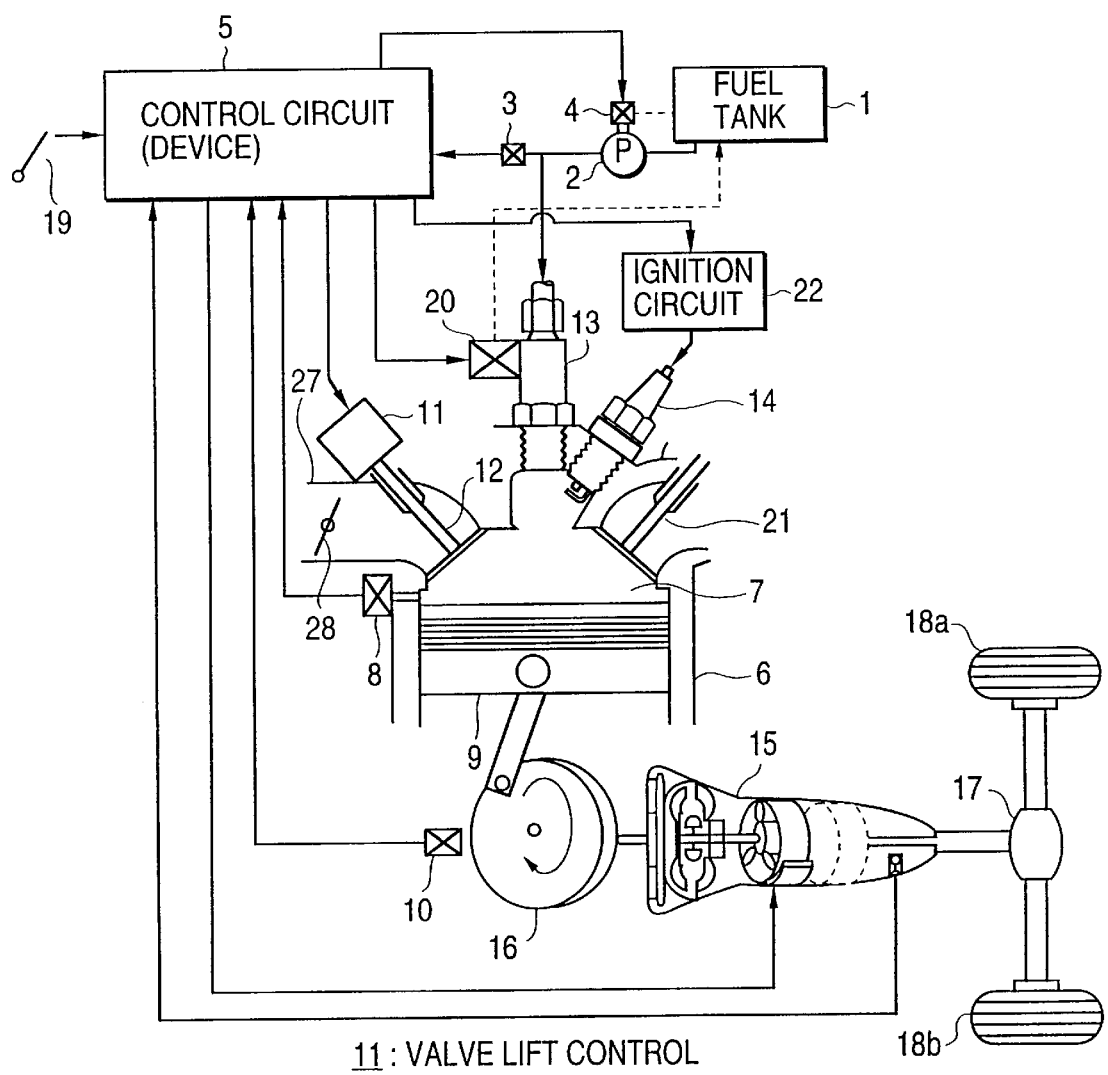
FIG. 1 is a view of a control system according to a first embodiment of the present invention.

FIG. 1 shows the construction of a control system according to a first embodiment of the invention. Fuel is fed from a fuel tank 1 to a fuel pump 2, and the fuel is pressurized by this pump 2. A pressure sensor 3 detects the pressure of the pressurized fuel, and feeds a pressure signal to a control circuit 5. The control circuit 5 compares the fuel pressure with a predetermined target value, and if the fuel pressure is higher than this predetermined value, a spill valve 4 of the fuel pump 2 is opened to control the fuel pressure to the target pressure. The pressurized fuel is fed to a fuel injection valve 13. A signal (torque signal) intended by the driver is fed from an accelerator pedal 19 to the control circuit 5. In response to this signal, the control circuit 5 calculates an amount of one injection, taking a signal from an engine speed sensor 10 into account, and feeds a signal to an injection valve drive portion 20 of the fuel injection valve 13. As a result, the fuel injection valve 13 is opened to inject the fuel into a combustion chamber 7. The timing of injection of the fuel and the amount of injection (injection time) at this time are optimally determined by the control circuit 5. A signal is fed from the control circuit 5 to an ignition circuit 22 at an optimum timing, and a high voltage is produced by the ignition circuit 22, and is fed to an ignition plug 14, so that the ignition plug 14 produces a spark to ignite the fuel injected into the combustion chamber 7. The pressure within the combustion chamber 7 increases, and acts on a piston 9 to impart a rotational force to a crankshaft 16, and tires 18a and 18b are driven through a transmission 15 and a differential gear 17, thus causing a vehicle to travel. With respect to the torque produced by an engine 6, the combustion pressure within the combustion chamber 7 is detected by a pressure sensor 8, and is fed to the control circuit 5, and is compared with the signal of the accelerator pedal 19 intended by the driver. The result of this comparison is reflected on the next or subsequent fuel injection in the cylinder. An amount of the air in the engine 6 is measured by an air amount sensor, and the flow rate of the air is controlled by a throttle valve. The air is also controlled by a swirl control valve 28, provided in an intake manifold 27, so that a suitable turbulence can be formed in the cylinder. A valve lift of an intake valve 12 is controlled by a valve lift control device 11. Combustion gas is discharged from an exhaust valve 21.

Figure 2:
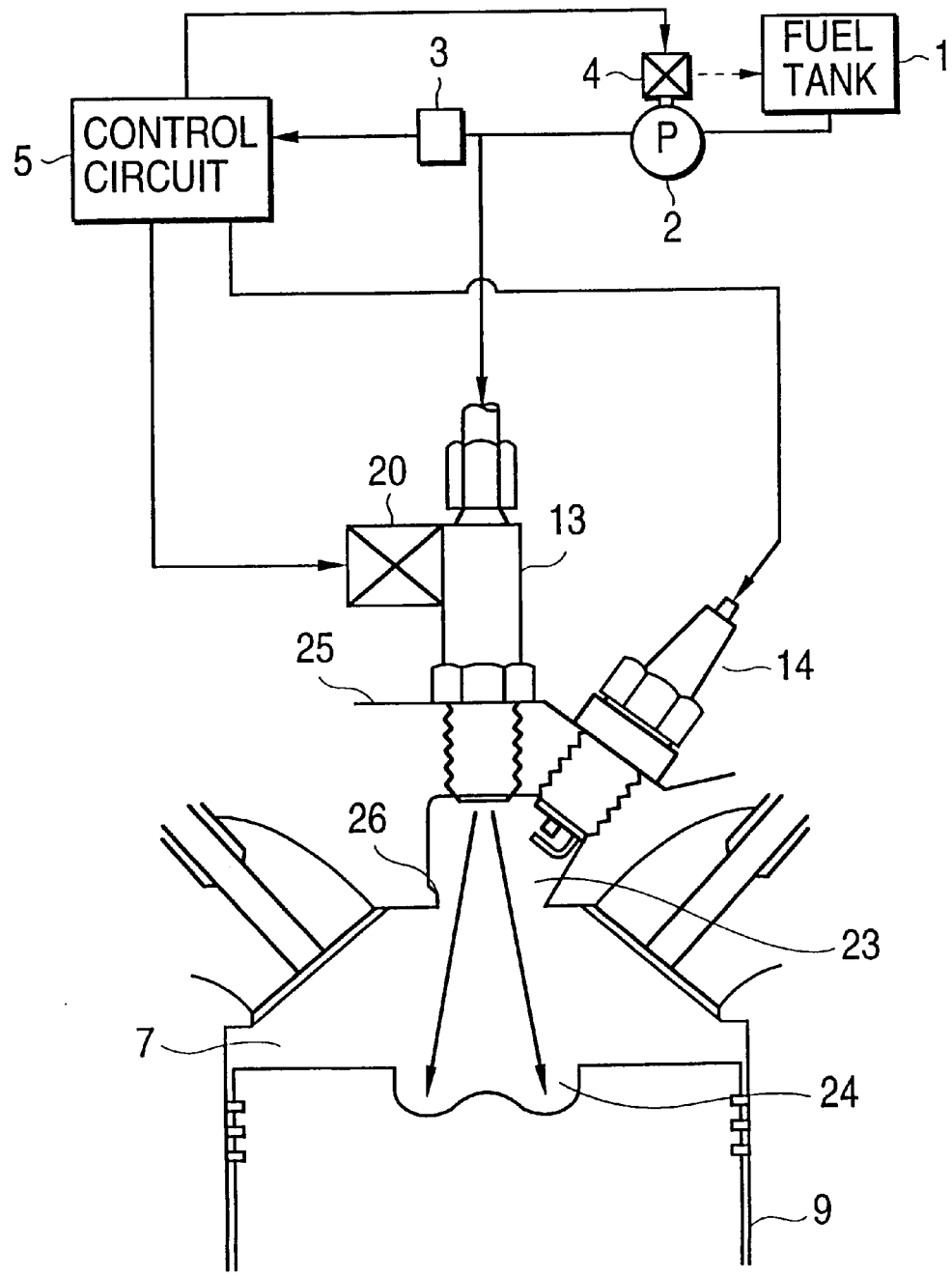
FIG. 2 is a vertical cross-sectional view of a combustion chamber.

The first embodiment of the present invention will now be described with reference to FIG. 2 which is a vertical cross-sectional view of the combustion chamber. The fuel injection valve 13 and the ignition plug 14 are provided at an auxiliary combustion chamber 23 formed at an engine head 25. With respect to the positional relation between the fuel injection valve 13 and the ignition plug 14, it is preferred that the ignition plug 14 be disposed downstream of the spray emitted from the fuel injection valve 13. With this arrangement, a flame core produced by the ignition plug 14 is liable to be spread by the spray to the combustion chamber 7 and a cavity 24 formed in the piston 9. However, if the ignition plug 14 is disposed too close to the spray, the ignition plug 14 gets wet with the spray, so that an incomplete ignition may be caused. Therefore, it is important to properly determine the above positional relation. By throttling an outlet portion 26 of the auxiliary combustion chamber 23, the speed of injection or jetting-out of the flame core can be adjusted. In this case, if the throttling is excessive, a pressure loss develops, so that the heat efficiency is lowered.

Figure 3:
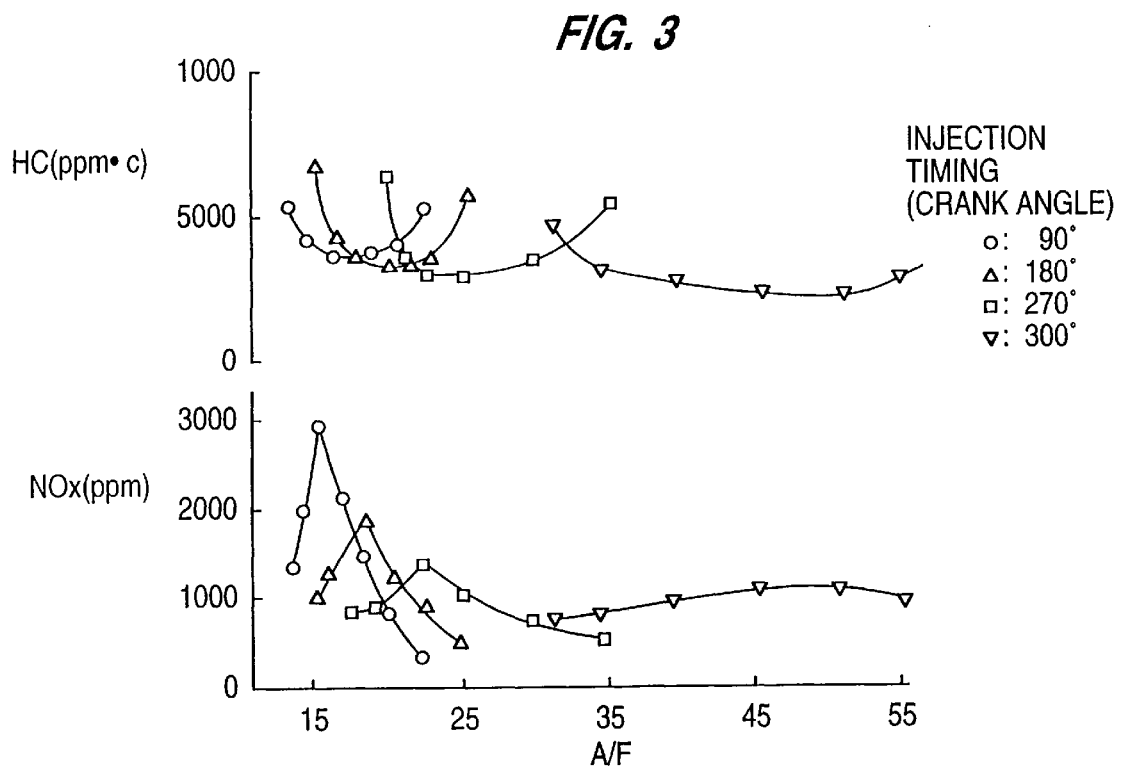
FIG. 3 is a diagram showing the correlation between the air/fuel ratio A/F and HC in exhaust gas, as well as the relation between A/F and NOx in the exhaust gas.

FIG. 3 shows the relation between the air/fuel ratio A/F and the exhaust gas (HC, NOx). When the fuel injection timing is a crank angle of 90°, the peak value of NOx is obtained when A/F is nearly 16. Such a change in the amount of discharge of NOx tends to be seen in a uniform mixture. The reason is that when the fuel injection timing is a crank angle 90° or up to an intermediate stage of the intake stroke, the injection spray spreads out over the entire area in the cylinder because of flows of the air within the cylinder which flows are caused by the movement of the piston and the intake operation. As the injection timing defined by the crank angle becomes greater, the air/fuel ratio, at which the peak value of NOx is obtained, becomes larger. At the same time, the production of NOx becomes gentle. Also, the amount of discharge of HC varies. Comparing the injection timing 90° with the injection timing 180°, the amount of HC at the injection timing 90° at A/F of nearly 15 is 3,800 ppmC while the amount of HC at the injection timing 180° at A/F of nearly 15 is 6,500 ppmC. The reason why the amount of HC thus differs at the same air/fuel ratio is that the air/fuel ratio at the region where the combustion is effected is different. Namely, the air/fuel ratio at the region where the combustion is actually effected at the injection timing 180° is smaller. Therefore, when the air/fuel ratio increases, a combustion failure (extinction or flame-out) occurs at the injection timing 90° at the smaller air/fuel ratio. The reason why the air/fuel ratio, enabling a stable combustion (the amount of HC does not increase), increases with the increase of the injection timing is that the increased fuel injection timing approaches the ignition timing, so that the fuel becomes less liable to spread, thus providing the stratified mixture. By thus selecting the injection timing, the uniform mixture and the stratified mixture can be formed freely. Therefore, when the engine torque is small, the injection timing is increased to be brought near to the ignition timing. As the torque increases, the injection timing is decreased to bring the mixture close to a uniform one.

Figure 5:
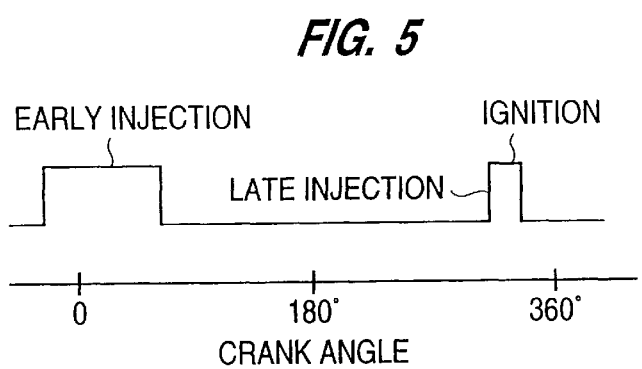
FIG. 5 is a chart showing a fuel injection timing.
Figure 4:
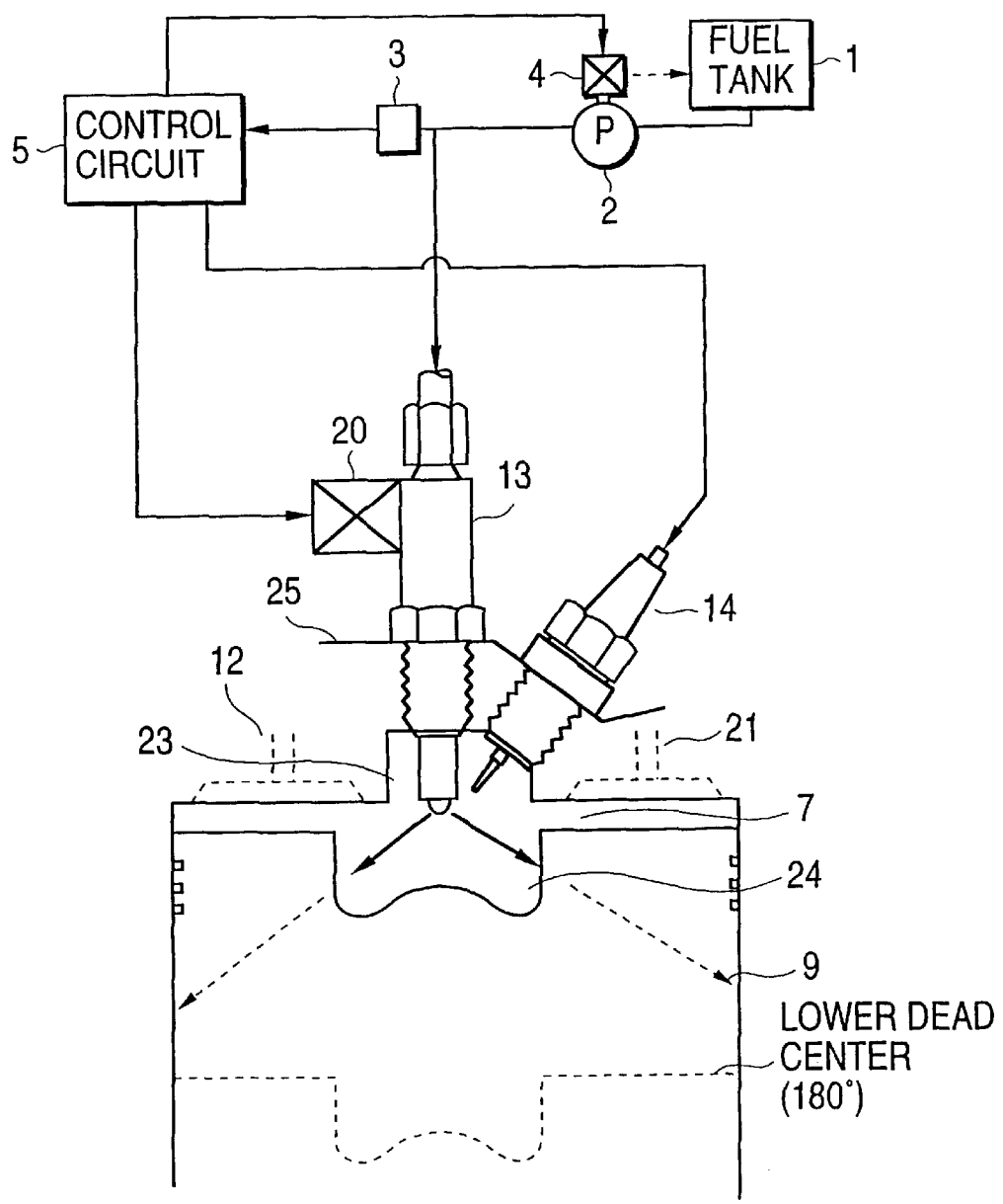
FIG. 4 is a vertical cross-sectional view of a combustion chamber as in FIG. 2, but showing a second embodiment of the invention.

FIG. 4 shows a vertical cross-sectional view of a combustion chamber of a second embodiment. In this embodiment, a fuel injection valve 13 is projected into the combustion chamber 7, and an injection port is so formed that the fuel can spread widely within a cylinder. In this case, when the fuel is injected when a piston is lowered to a point near to a bottom dead center, the fuel impinges directly on a wall surface of the cylinder to form a wall flow. In this condition, a good combustion can not be expected. Therefore, where the injection valve injects a wide spray, the fuel need to be injected at such a timing that a cavity 24 is disposed near to an upper dead center, and that the fuel can be blown into the cavity 24. For example, the injection of the fuel can be effected a plurality of times in a divided manner, as shown in FIG. 5. An early injection is effected at a crank angle of nearly 0° to form a uniform mixture. A combustion initiator is produced by a late injection effected at a timing near the ignition timing, and the uniform mixture produced by the early injection is rapidly burned thereby. The injection amount can be adjusted by any of the late injection and the early injection, and therefore the injection can be effected in the optimum condition. In the case where the injection is thus divided into the two injections (that is, the early injection and the late injection), the effect can be obtained also with the injection valve (FIG. 2) having a small injection angle.

Figure 6:
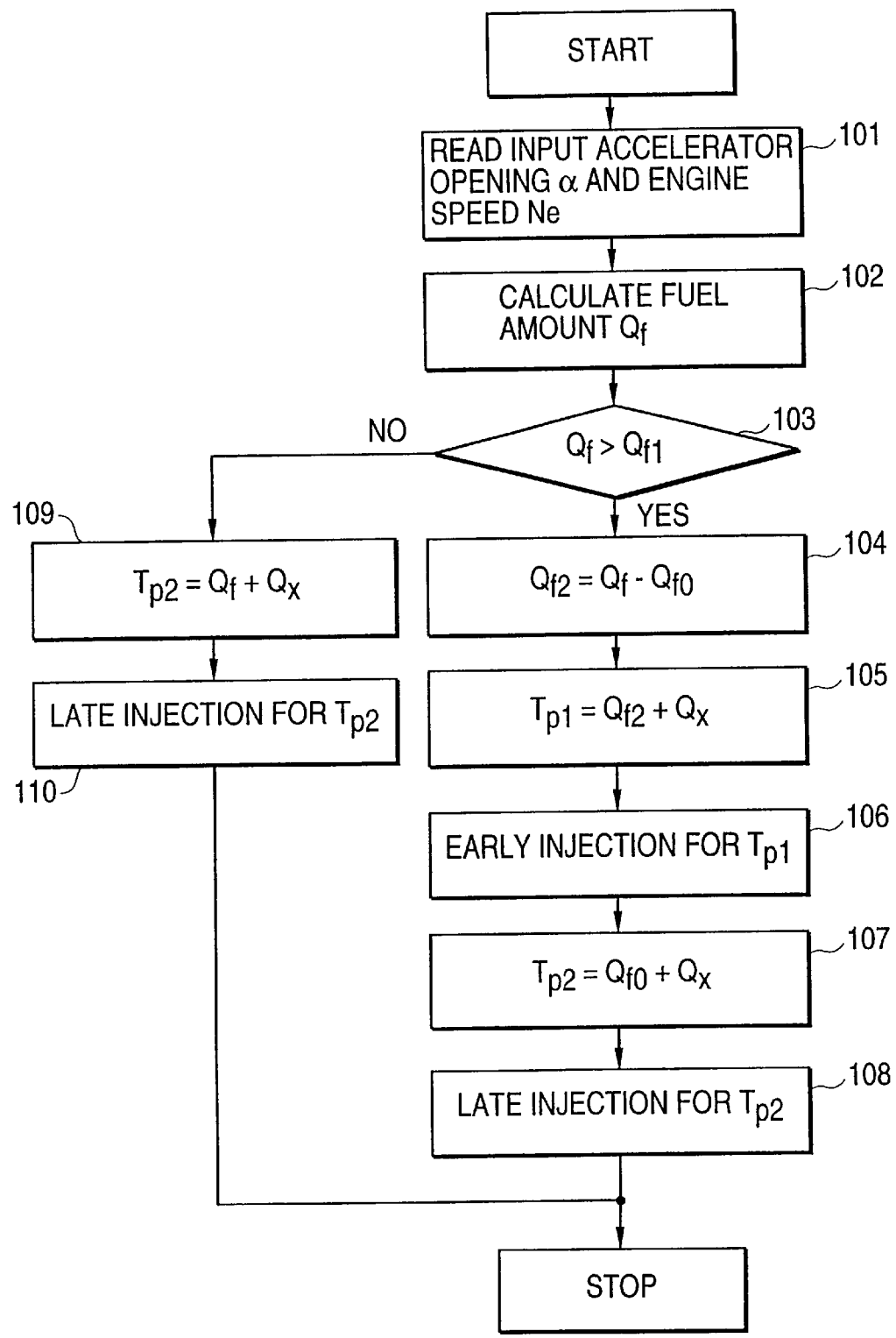
FIG. 6 is a flow chart for the calculation of a fuel injection time.

FIG. 6 shows a flow chart for calculation of the fuel injection time in the case where the early injection and the late injection are effected. In Step 101, an accelerator opening degree α and an engine speed Ne are read. At this time, if the air amount is measured, the air amount Qa may be also read. In Step 102, the fuel amount Qf is calculated. In Step 103, Qf>Qf1 is judged. If the judgment result is "NO", the program proceeds to Step 109 in which the injection time Tp2 is calculated by adding an invalid injection amount Qx to Qf. In Step 110, the fuel for Tp2 is injected at the timing of the late injection, and the program is finished. If the judgment result in Step 103 is "YES", the program proceeds to Step 104 in which Of2 is calculated by subtracting a minimum injection amount Qf0 from Qf. In Step 105, the injection time Tp1 is calculated by adding the invalid injection amount Qx to Qf2. The fuel for Tp1 is injected at the timing of the early injection. In Step 107, Tp2 is calculated by adding Qx to Qf0, and the fuel for Tp2 is injected at the timing of the late injection. Thus, for each of the early and late injections, it is necessary to add the invalid injection amount Qx.

Figure 7:
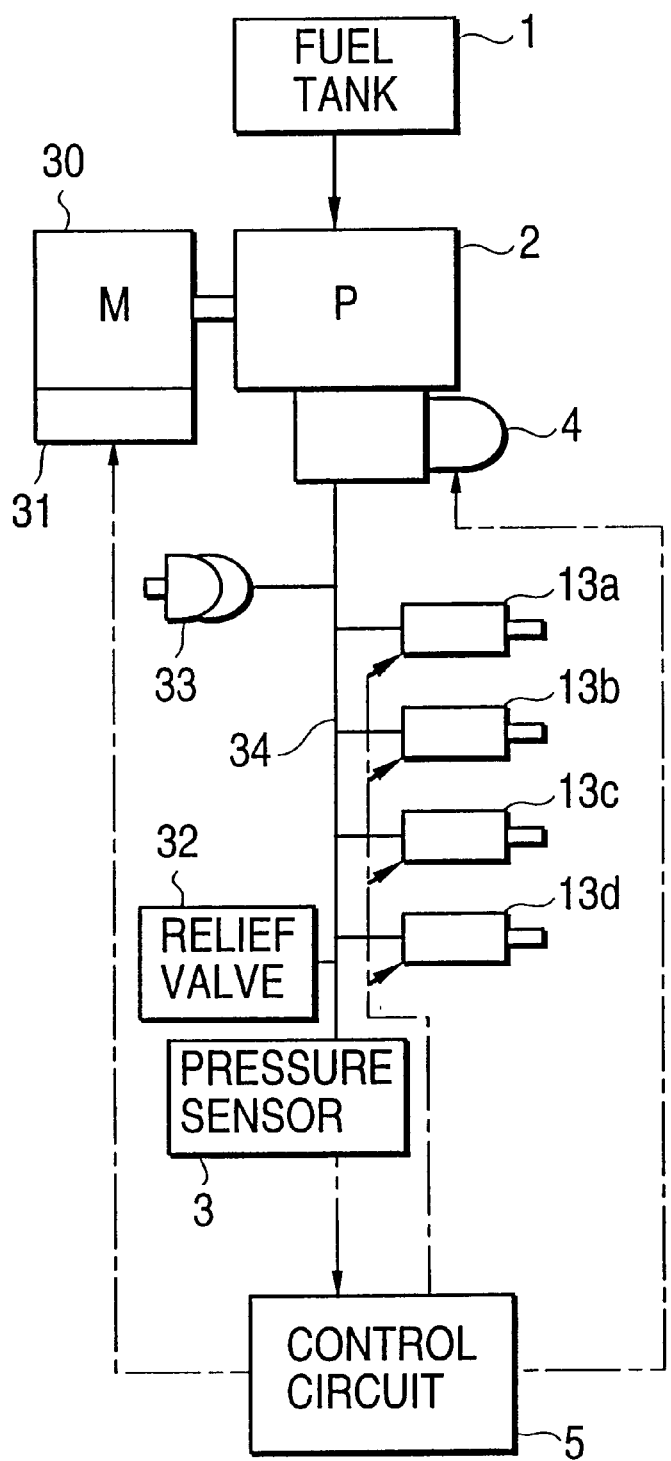
FIG. 7 is a block diagram of a fuel pressure control device.

FIG. 7 shows a control system for controlling the fuel pressure. Fuel for the fuel pump 2 is fed from the fuel tank 1. The fuel pump 2 is driven by a motor 30, and the pressurized fuel is fed to a high-pressure pipe 34. Injection valves 13a to 13d, an accumulator 33, the fuel pressure sensor 3, and a relief valve 32 are mounted on the high-pressure pipe 34. Gas is sealed as a damper in the relief valve 33, and when the fuel pressure increases, the fuel flows into the accumulator 33. When the pressure decreases, the accumulator 33 discharges the fuel into the high-pressure pipe 34. When the fuel pressure becomes unduly high, the relief valve 32 allows the fuel to flow therethrough, thereby preventing the pressure increase. The fuel pressure sensor 3 feeds a signal, proportional to the pressure, to the control circuit 5, and in response to this signal, the control circuit 5 feeds a signal to the electromagnetic spill device 4 to control the discharge amount of the fuel pump 2, thereby controlling the fuel pressure. Also, in response to the signal from the pressure sensor 3, the control circuit 5 feeds a signal to a controller 31 of the motor 30 to control the rotational speed of the fuel pump 30, thereby controlling the fuel pressure. In this embodiment, although the electromagnetic spill device 4 and the controller 31 are both provided, the fuel pressure can be controlled by one of them. However, in the case where the fuel pump 2 is driven by the engine, only the electromagnetic spill device 4 is used for this purpose since the motor 30 is not provided.

Figure 8:
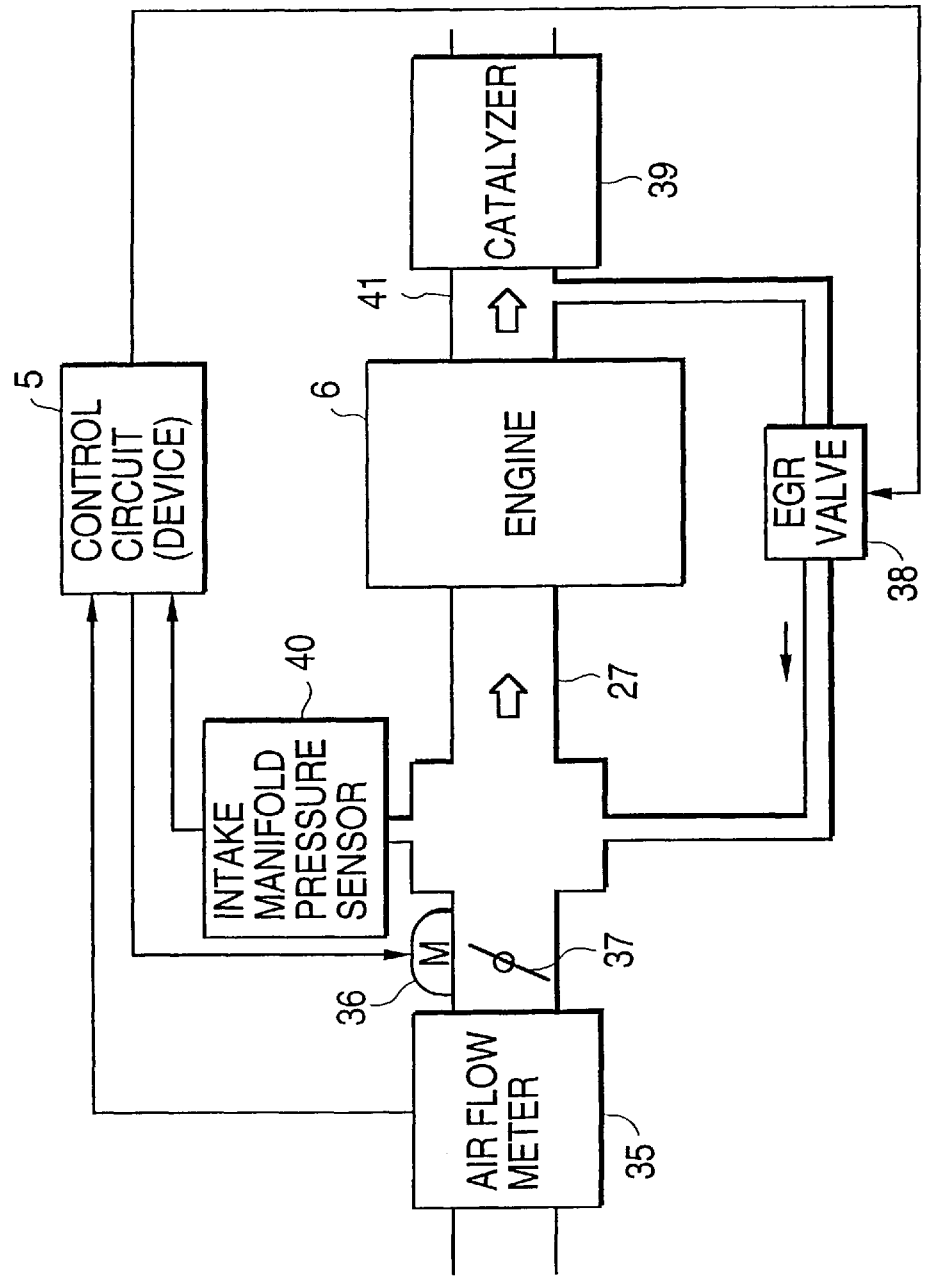
FIG. 8 is a view showing an EGR control system.

FIG. 8 shows a control system diagram of EGR. The air enters the engine 6 through an air flow meter 35, a throttle valve 37 and the intake manifold 27, and is discharged as exhaust gas to exhaust pipe 41. A catalyzer 39 is provided in the exhaust pipe 41. Here, when EGR becomes necessary, the control device 5 feeds a signal to an EGR valve 38 to open the same. The control device 5 also feeds a signal to a throttle valve actuator 36 to close the throttle valve 37 to thereby reduce the pressure of the intake manifold 27 to a level lower than the atmospheric pressure. As a result, the exhaust gas flows from the exhaust pipe 41 to the intake manifold 27 through the EGR valve 38 in proportion to the negative pressure of the intake manifold. The rate of flow of the exhaust gas at this time is proportional to the negative pressure of the intake manifold, and therefore the pressure of the intake manifold is detected by an intake manifold pressure sensor 40, and a signal is fed from this sensor 40 to the control device 5, and the degree of opening of the throttle valve 37 is adjusted by the throttle valve actuator 36. By controlling the degree of opening of the throttle valve 37, the pressure of the intake manifold 27 can be controlled, and the EGR amount can be accurately controlled by a feedback control.

Figure 9:
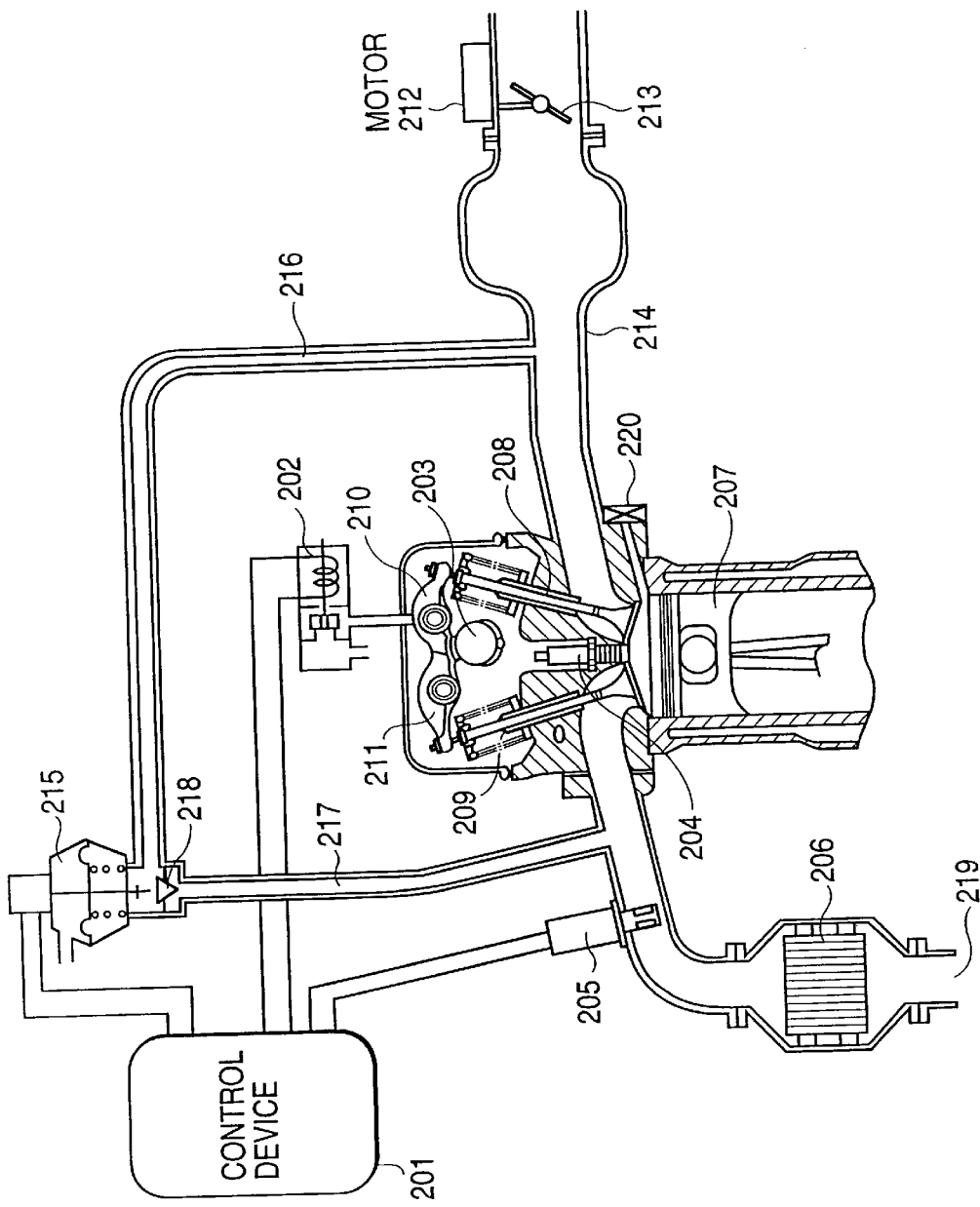
FIG. 9 is a diagram showing the construction of a control system according to a third embodiment of the invention.

FIG. 9 shows a third embodiment of the present invention. The air is controlled by a throttle valve 213, and is drawn into an engine through an intake manifold 214. A lift of an intake valve 208 can be changed by switching cams 203 of different shapes. The switching of the cams 203 is effected by switching rocker arms 210 by a hydraulic control valve 202. The hydraulic control valve 202 is operated, for example, by a solenoid. The degree of opening of the throttle valve 213 is controlled by a motor 212. A sensor 220 for detecting a pressure within a cylinder is mounted on the engine. An injection valve 204 for injecting the fuel directly into the cylinder is mounted on the engine. A sensor 205 for detecting the air/fuel ratio of exhaust gas is mounted on an exhaust pipe. A catalyzer is also provided in the exhaust pipe. Preferably, the catalyzer or catalyst is of a type which can remove NOx even when an excessive amount of oxygen is present. Also, function of a three-way catalyst, which can remove HC, CO and NOx at the same time under the condition of a stoichiometric air/fuel ratio, is needed. Part of the exhaust gas is controlled by valves 215 and 218 which control the flow rate in the exhaust pipe. With this arrangement, the combustion temperature is decreased, thereby reducing the amount of NOx. These control valves are controlled by a control device 201. In order to reduce the fuel consumption, it is preferred that the pressure within the intake manifold be reduced to a level close to the atmospheric pressure, thereby reducing a pumping loss. For this purpose, the throttle valve 213 is fully opened as much as possible. However, in the case where the exhaust gas is recirculated through a pipe 216, it is necessary that the pressure within the intake manifold should be lower than the pressure within the exhaust pipe, and therefore the throttle valve is closed.

Figure 10:
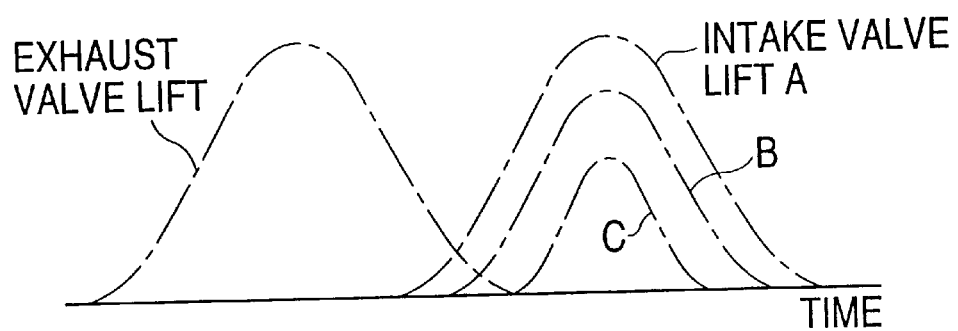
FIG. 10 is a time chart showing the operation of an intake valve.

FIG. 10 shows the operation of the third embodiment of the present invention. According to the operating conditions, the lift of the intake valve cam is changed, as shown in FIG. 10. When a large amount of the air is required, the lift of the intake valve is set as at A. When the amount of the air is small, the lift of the intake valve is changed into a lift B or a lift C. By changing the lift, the overlap with an exhaust valve is also changed. During a high-output or power operation, the period of overlap between the exhaust valve and the intake valve is made longer. With this arrangement, the amount of the air can be changed by the lift of the intake valve.

Figure 11:
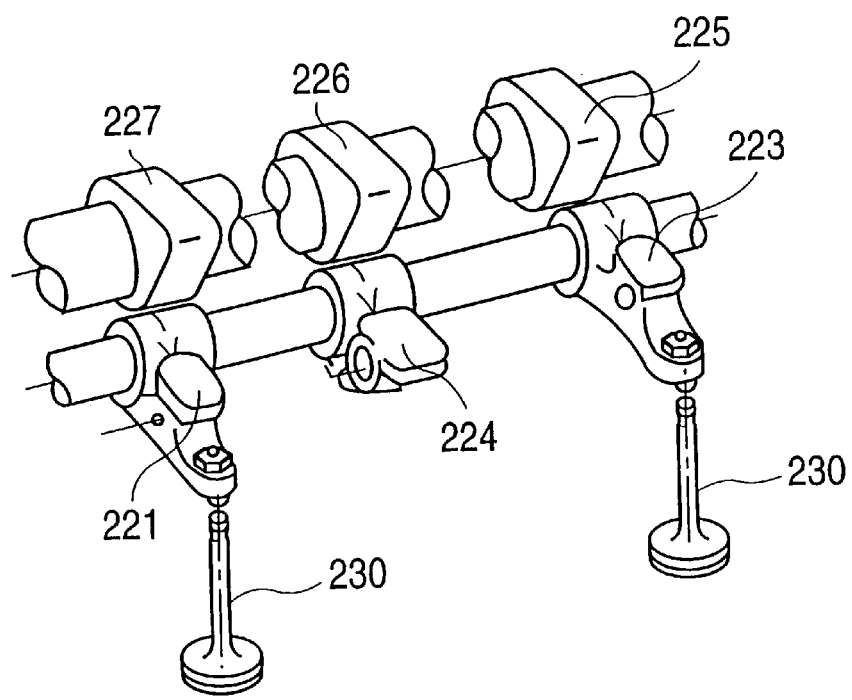
FIG. 11 is a perspective view showing rocker arms.

FIG. 11 shows one example of the construction of rocker arms 221, 223 and 224 and cams 225, 226 and 227. The rocker arm 223 and the cam 225 drive the intake valve for reciprocal movement. The rocker arm 226 and the cam 224 are not fixed to each other, and are in a free condition. When switching the cams, the rocker arm 224 and the cam 226 drive the intake valve for reciprocal movement. The rocker arm 223 and the cam 225 are not fixed to each other, and are in a free condition. With this construction, the cams can be switched. In this example, although the lift of the cam is changed, the shape of the cam may be changed so as to control the valve opening timing and the valve closing timing at the same time.

Figure 12:
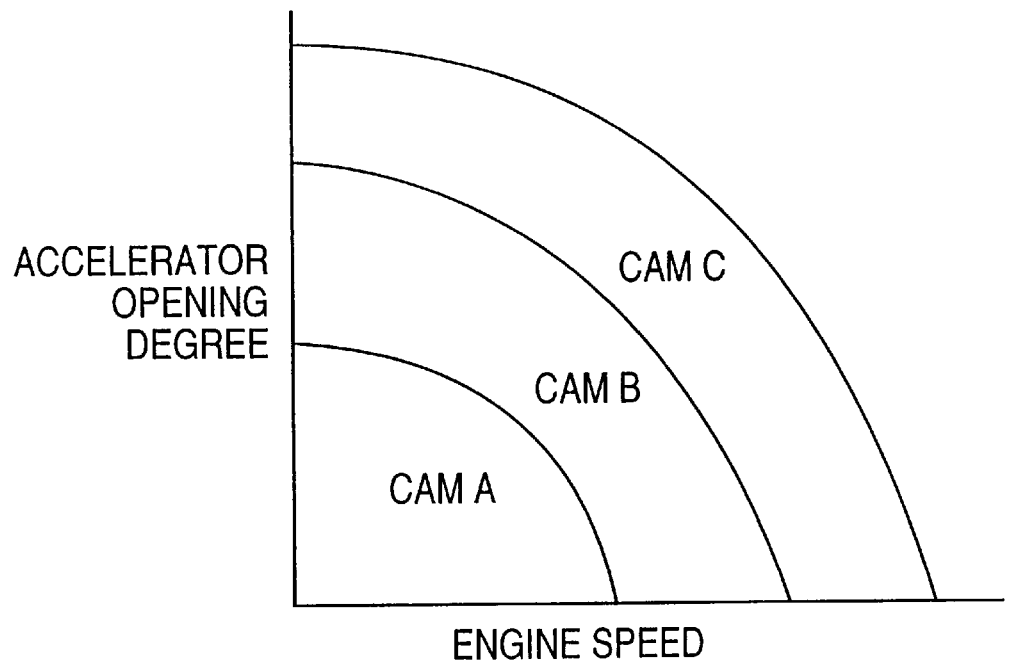
FIG. 12 is a map diagram for selecting a cam in connection with the relation between an engine speed and an accelerator opening degree.

FIG. 12 shows a map for selecting the cam in connection with the degree of opening of an accelerator and the engine speed. In this example, the cam switching can be effected in a three-stage manner. When the engine speed is low, with the accelerator opening degree kept low, a cam A for a small lift is selected. As the engine speed and the accelerator opening degree increase, the cam is sequentially switched to those providing a larger lift.

Figure 13:
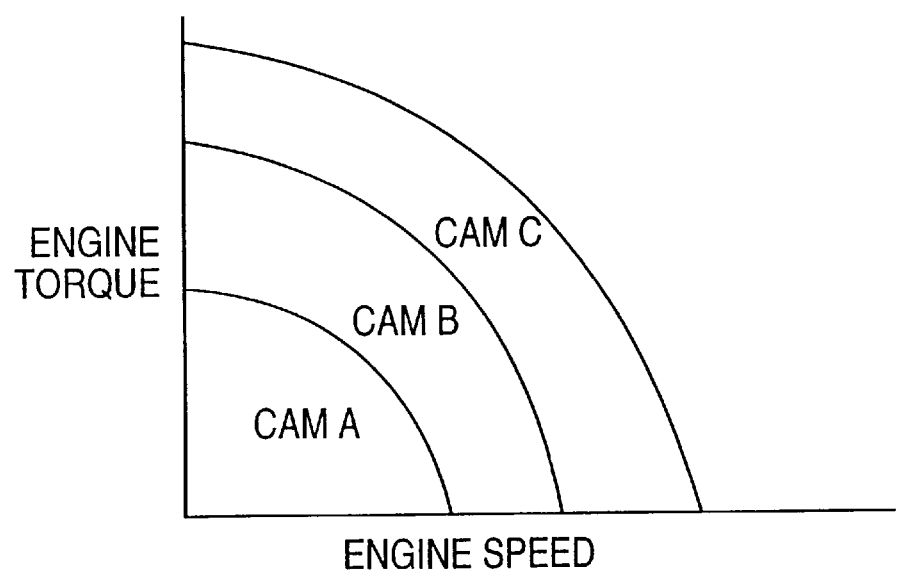
FIG. 13 is a map diagram for selecting a cam in connection with the relation between the engine speed and an engine torque.

FIG. 13 shows a map for selecting the cam in connection with the engine torque and the engine speed. In this example, the cam switching can be effected in a three-stage manner. The engine torque has target torque values predetermined with respect to the accelerator opening degree. When the engine speed is low, with the engine torque kept small, a cam A for a small lift is selected. As the engine speed and the engine torque increase, the cam is sequentially switched to those providing a larger lift.

Figure 14:
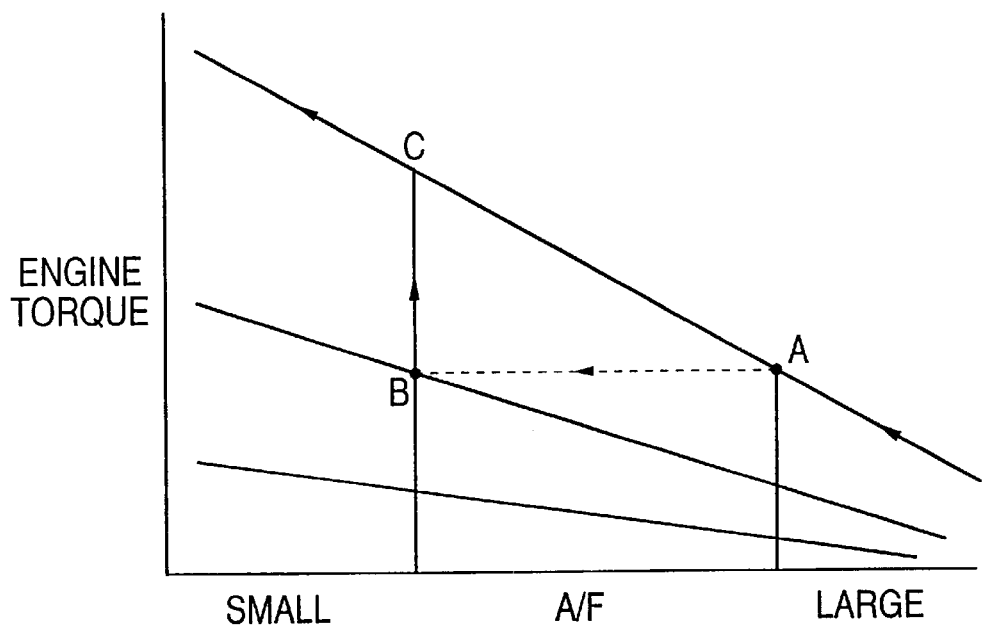
FIG. 14 is a diagram showing the correlation between the air/fuel ratio A/F and the engine torque.

FIG. 14 shows a method of controlling the amount of the intake air when switching the air/fuel ratio A/F. When the full-opening of the throttle valve or the cam for a large lift is selected, the fuel amount increases with the decrease of the air/fuel ratio, so that the engine torque (output torque) increases. At the air/fuel ratio of around 16, the amount of discharge of NOx tends to increase, and therefore the air/fuel ratio is skipped from 18 to 15. At this time, if the air/fuel ratio is switched to 15, with the air amount kept intact, the amount of the fuel increases, so that the engine torque increases as at C. This gives a sense of difference or a feeling of physical disorder. Therefore, when switching the air/fuel ratio, the air amount is reduced to prevent the increase of the fuel amount, and the engine torque is changed from A to B (FIG. 14), thereby reducing a shock. The air amount is adjusted by the throttle valve or by switching the cam. If this is effected by the throttle valve, the pressure within the intake manifold is decreased, thereby increasing the pumping loss. Therefore, preferably, this is done by switching the cam as much as possible. Also, when the engine torque decreases to such a level that the target engine torque is not achieved even if the air/fuel ratio is not less than 70, the air amount is adjusted by the cam or the throttle valve.

Figure 15:
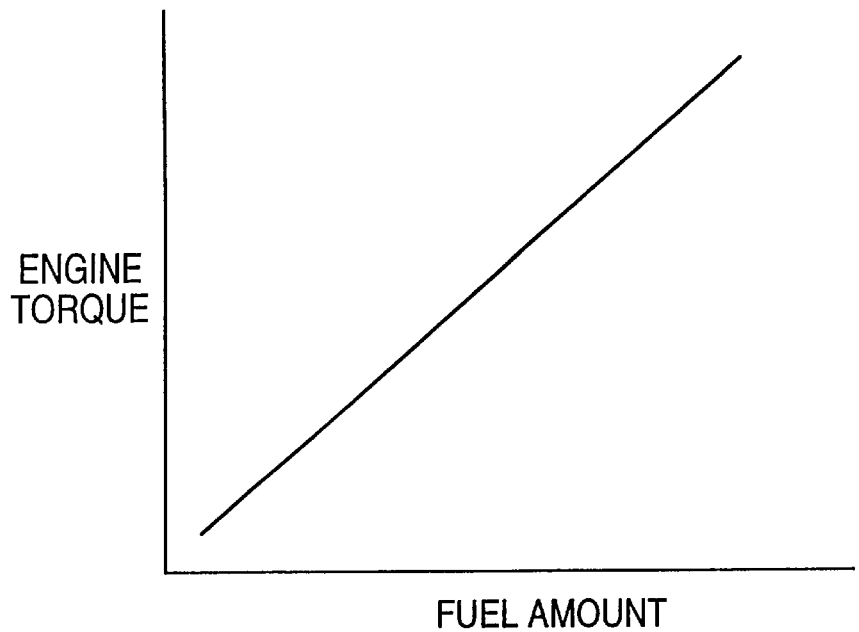
FIG. 15 is a diagram showing the correlation between the fuel amount and the engine torque.

FIG. 15 shows the relation between the amount of the fuel and the engine torque (output torque). The engine torque can be increased by increasing the fuel amount, and therefore the engine torque can be controlled by the fuel amount.

Figure 16:
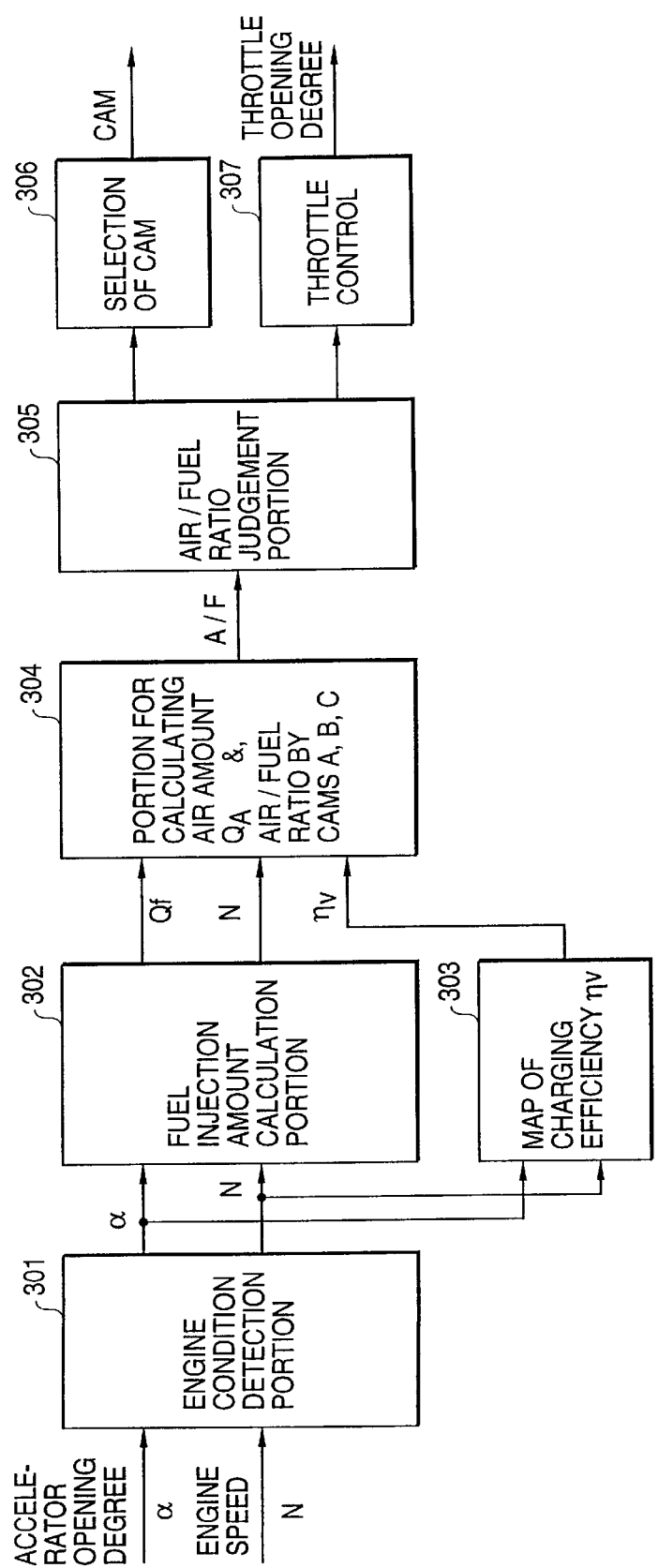
FIG. 16 is a block diagram of a control system according to a fourth embodiment of the invention.

FIG. 16 shows a fourth embodiment of the present invention. The amount Qf of injection of fuel is determined by an engine condition detection portion 301 (which detects the conditions of an engine such as an accelerator opening degree α and an engine speed N) and a fuel injection amount calculation portion 302 which calculates the amount Qf of injection of the fuel. In accordance with a charging efficiency map 303, the amount of the air of the engine is calculated at a portion 304, and the air amount by each cam is determined, thus calculating the air/fuel ratio. It is judged at a portion 305 whether or not the air/fuel ratio is within a combustible range. The cam is selected at a portion 306, and the degree of opening of a throttle valve is determined at a portion 307. If the air amount is excessive, the mixture becomes too lean, and therefore the cam is switched to one providing a smaller lift. In the injection within the cylinder, since the mixture within the cylinder is directly controlled, the limit of the lean mixture can be expanded as compared with a conventional intake port injection system, and therefore the range of the engine torque which can be controlled by the fuel amount is wider. Therefore, the engine torque can be controlled by the fuel amount without the need for finely controlling the air amount as in the conventional system.

Figure 17:
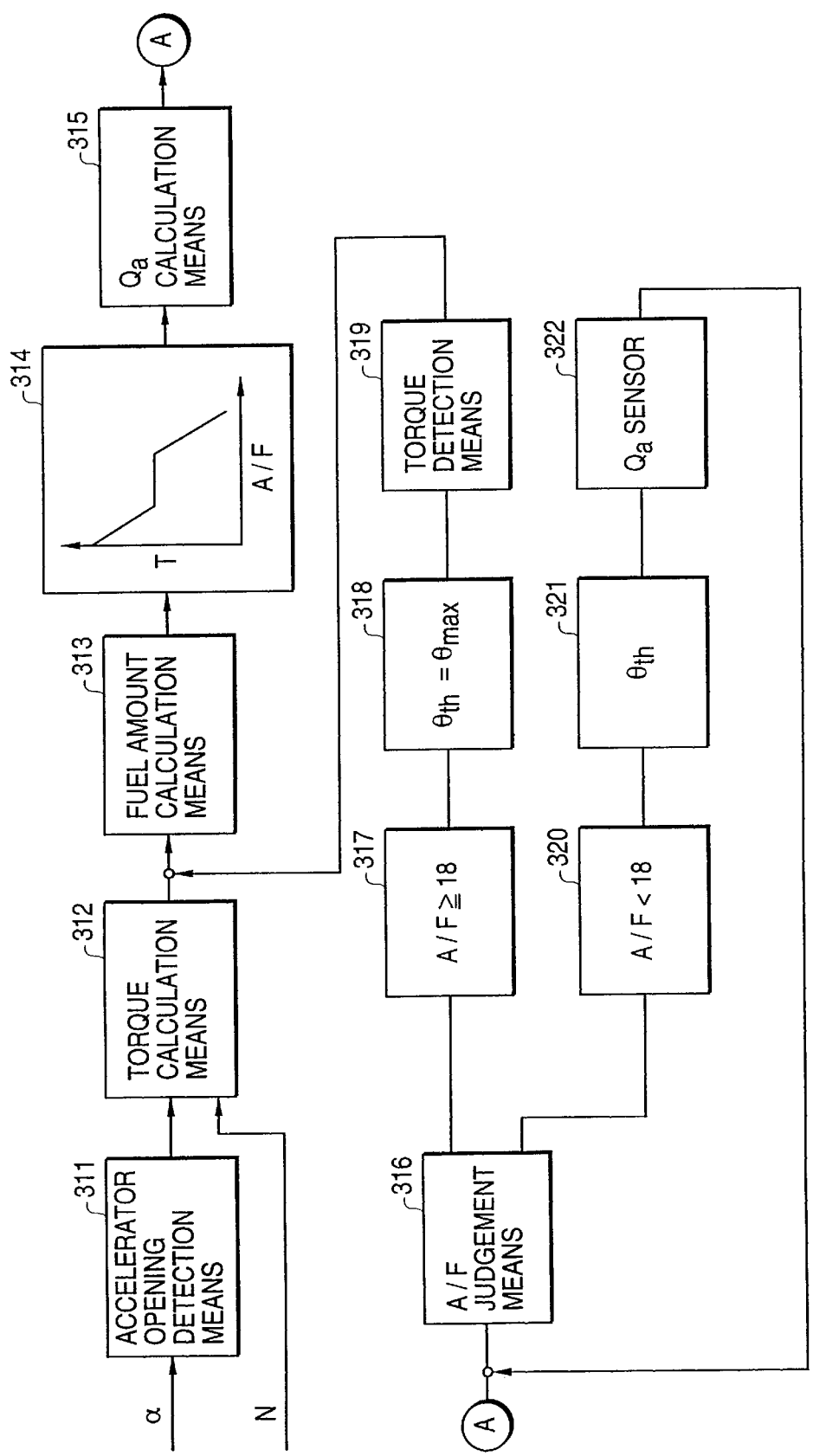
FIG. 17 is a block diagram of a control system according to a fifth embodiment of the invention.

FIG. 17 shows a fifth embodiment of the present invention. An accelerator opening degree is detected by a detection means 311, and a target torque is determined by a calculation means 312. An amount of fuel is determined by a fuel amount calculation means 313 in accordance with the target torque. If the air/fuel ratio is predetermined with respect to the engine torque (output torque) T at a portion 314, the air amount Qa can be derived. The air/fuel ratio is judged by a judgment means 316. If the air/fuel ratio is not less than 18, a throttle valve is fully opened, i.e. its opening degree θth→θmax, at a portion 318, and the torque of the engine is detected by a torque detection means 319, and the fuel injection amount is controlled so that the target torque can be obtained. On the other hand, if the air/fuel ratio is less than 18, the air amount is controlled by the throttle valve 321 so that the target air/fuel ratio can be achieved. The air amount is controlled, for example, by the throttle valve opening degree θth or the lift by a cam. Here, the air amount may be detected by an air amount sensor 322 to control the air amount to a target value thereof.

Figure 18:
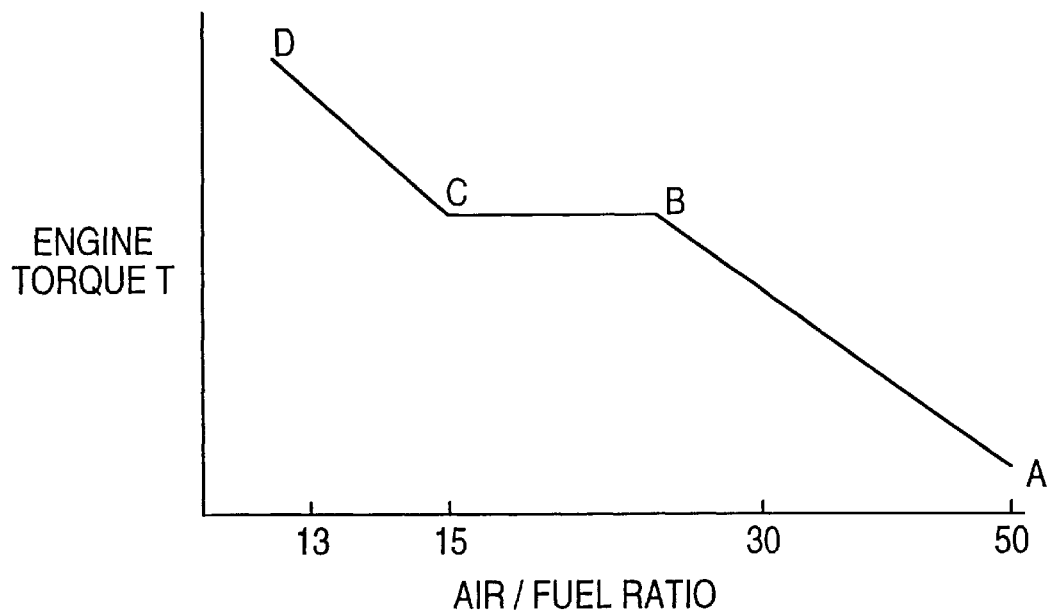
FIG. 18 is a map diagram showing the relation between the target air/fuel ratio and the engine torque.

FIG. 18 shows a map of the target air/fuel ratio. The air/fuel ratio is decreased with the increase of the engine torque (output torque) T. However, at point B, the air/fuel ratio is switched to a point C in a manner to skip over the air/fuel ratio value 16. For further increasing the torque, the air/fuel ratio is reduced toward a point D. If the air/fuel ratio is further reduced, the mixture becomes too rich. Therefore, preferably, at this region, the air amount is detected, and the air/fuel ratio is controlled.

Figure 19:
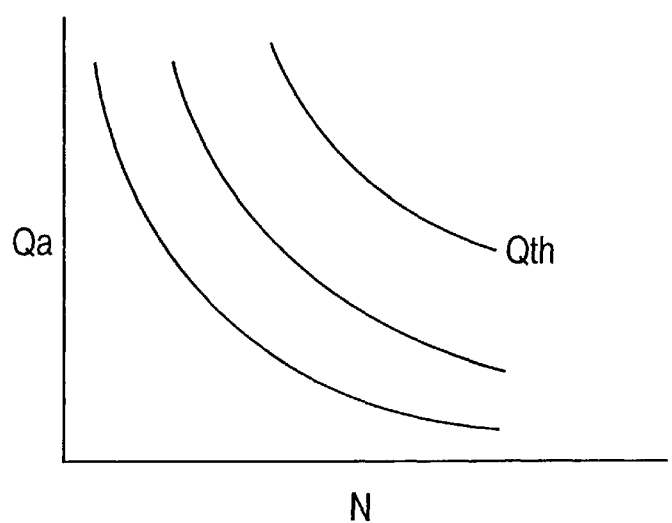
FIG. 19 is a diagram showing the correlation of a throttle valve opening degree with the engine speed and the intake air amount.

FIG. 19 shows the relation of the throttle valve opening degree θth with the engine speed N and the intake air amount Qa. For controlling the air amount by the throttle valve, the throttle valve opening degree is found from a map for the intake air amount. For effecting a more precise or fine control, the air amount is detected, and a feedback is effected.

FIGS. 20 and 21 shows a sixth embodiment of the present invention. If the air/fuel ratio is not less than 18, the mixture is so lean that the drivability and an exhaust cleaning effect may be lowered. Therefore, a combustion variation is detected, and a throttle valve opening degree or a cam lift are so set as to reduce the air amount.

Figure 22:
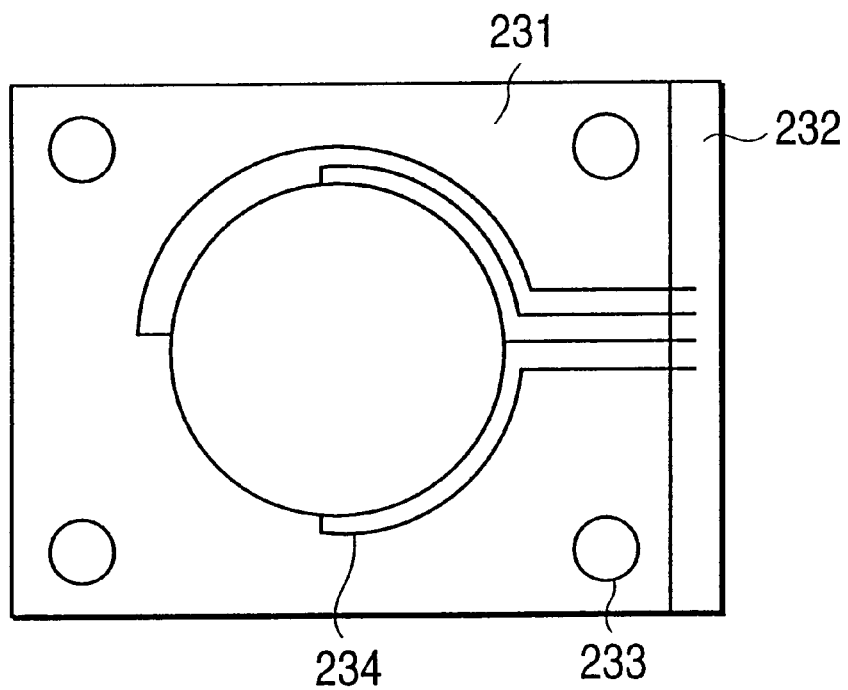
FIG. 22 is a top plan view showing the construction of a cylinder gasket of an engine in a seventh embodiment of the invention.

FIG. 22 shows a seventh embodiment of the present invention. An electrode or terminal 234 is embedded in a cylinder gasket 231 of an engine, and a high voltage is applied thereto from an electrode or terminal 232. Screw holes 233 are formed in the gasket.

Figure 23:
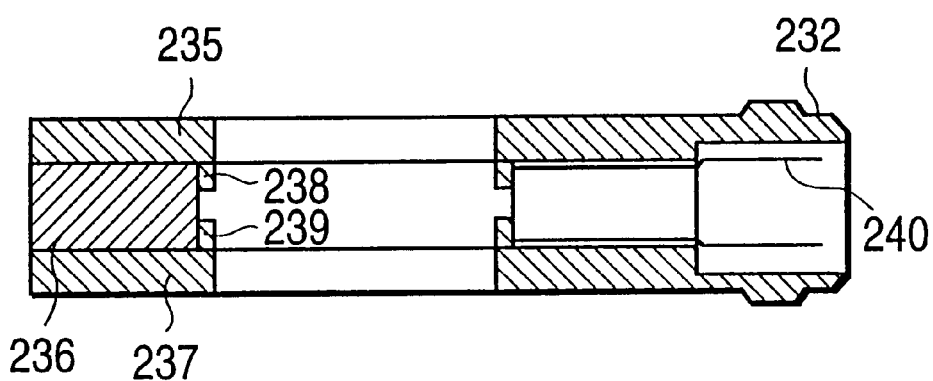
FIG. 23 is a vertical cross-sectional view of the construction of FIG. 22.

FIG. 23 is a vertical cross-sectional view of the portion of FIG. 22. A high voltage is applied across electrodes 238 and 239 from an ignition coil, thereby producing a spark discharge. With this arrangement, the mixture is ignited at a point near a cylinder wall surface and at other points as well, so that the combustion speed increases. Moreover, since the combustion is started adjacent to the wall surface, a so-called quench region near the wall surface is reduced, so that an amount of unburned hydrocarbon is reduced, and also a knocking is less liable to occur. Insulating layers 235 and 237 are provided on upper and lower surfaces of the gasket, respectively. If the electrode 239 is an earth or ground electrode, the insulating layer 237 may be omitted.

Figure 24:
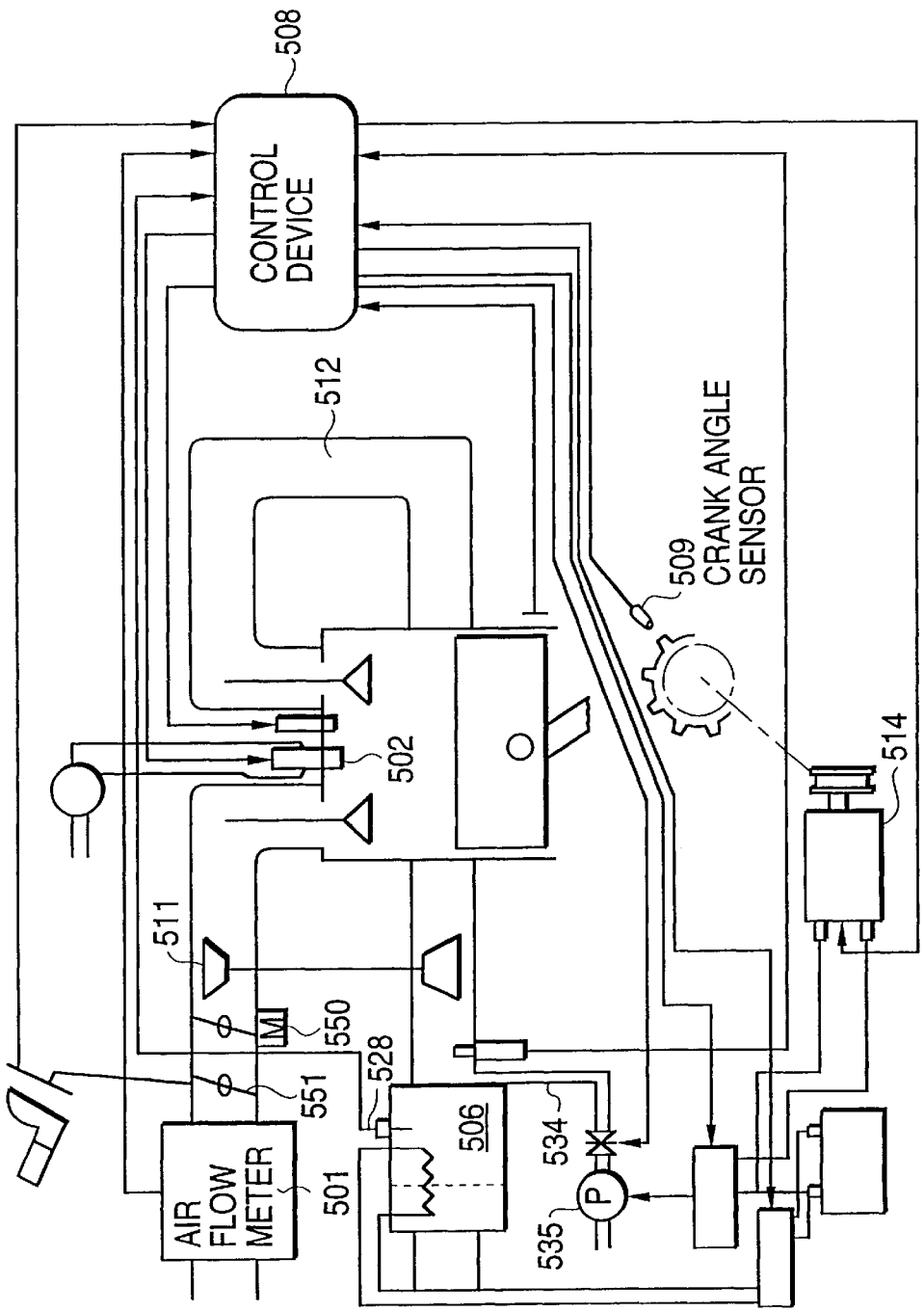
FIG. 24 is a view showing another embodiment of the invention.

An embodiment of the present invention will now be described with reference to FIG. 24. The amount of the intake air is measured by an air flow meter 501 mounted on an intake manifold. An engine speed is detected by a crank angle sensor 509. In accordance with the amount of the intake air into a cylinder, as well as the engine speed, the amount of fuel is determined, and the fuel is injected into the cylinder by a fuel injection valve 502. The air amount is controlled by a throttle valve 551, connected to an accelerator wire, and a throttle valve 550 controlled by a motor. The air amount may be controlled only by the throttle valve 550; however, if the throttle valve 551 connected to the accelerator wire is provided, the air amount will not become excessive even in the event of an abnormal operation of the throttle valve 550. A catalyzer 506, which can oxidize CO and HC, and can reduce NOx in an oxidizing atmosphere, is provided at an exhaust pipe 512. Therefore, even if oxygen is present in the exhaust gas as in a lean combustion, NOx can be reduced. The air/fuel ratio is detected by an air/fuel ratio sensor connected to the exhaust pipe, and it is examined whether or not a target air/fuel ratio is achieved. If the air/fuel ratio is more lean that the target value, the fuel amount is increased. HC is required for reducing NOx in an oxidizing atmosphere, and the temperature of the catalyzer is so controlled that a maximum cleaning efficiency of the catalyzer can be achieved. Therefore, the temperature of the catalyzer is detected by a temperature sensor 528, and the fuel injection amount and the ignition timing are so controlled that the target catalyzer temperature and HC can be obtained. A charging operation of a charger 514 can be controlled from the outside by a control device 508. The charging operation is effected during a deceleration, thereby recovering a deceleration energy. The amount of the intake air into the engine can be increased by a supercharger 511. The operation of the catalyzer is also influenced by the oxygen concentration in the exhaust gas, and therefore an air introduction passageway 534 is provided at an inlet of the catalyzer, and the air amount is controlled by a control valve 534. The air may be supplied by an air pump 535. When the air amount is increased, the catalyzer is cooled by the air, and therefore the air may be used for controlling the temperature of the catalyzer.

Figure 25:
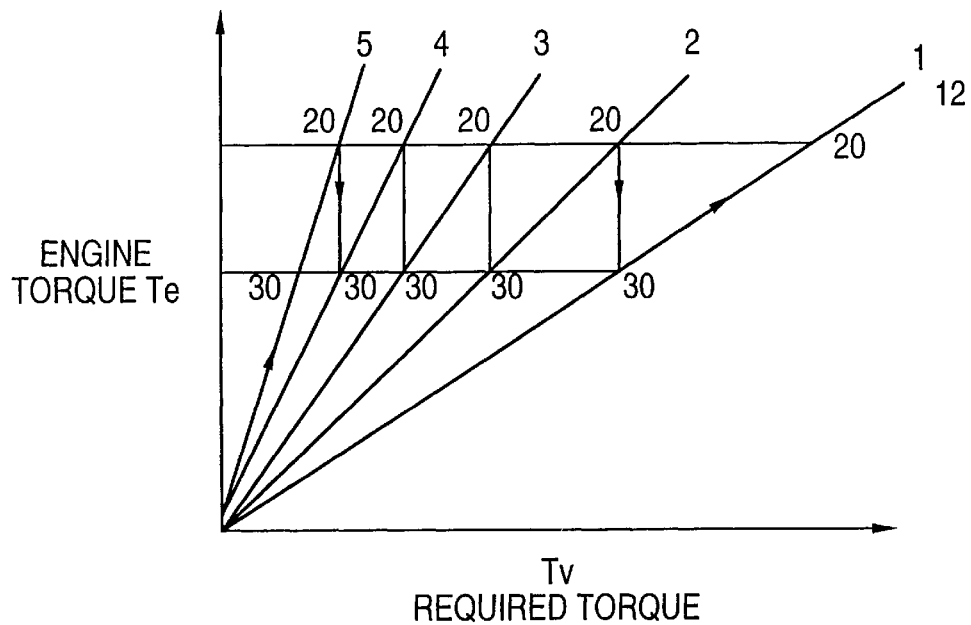
FIG. 25 is a diagram showing the correlation between a required torque and an engine torque.

FIG. 25 shows the relation between a required torque Tv and the engine torque Te. The description will be given with respect to an example in which a transmission (gearbox) has a five-stage (five-speed) gear ratio. In a fully-opened condition of the throttle valve, the fuel amount is changed. When the required torque Tv is small, a 5th speed (5th gear) with a small or low gear ratio is selected. When the required torque Tv becomes larger, the fuel amount is increased to increase the engine torque Te. At this time, in order to achieve a stable combustion, the fuel amount is within a lean combustion limit, and the air/fuel ratio is varied in the range of 30 to 20 so that the amount of NOx can be kept small. However, in view of the cleaning or removing property of the NOx catalyzer, the range of the air/fuel ratio may be changed. Also, if the stable combustion limit allows the air/fuel ratio to be further increased, the air/fuel ratio may be more than 30. A pumping loss is reduced when the operation is effected with a large air/fuel ratio, and the fuel consumption is enhanced. When the required torque Tv becomes further larger, the gear ratio is increased into a 4th speed. At this time, if the gear is changed with the air/fuel ratio kept at 20, the drive torque becomes excessive, so that a step develops in the torque, thereby adversely affecting the drivability. Therefore, the fuel amount is reduced to decrease the torque to be produced, thereby preventing a stepwise change in the drive torque. Similarly, as the required torque is increasing, the gear is sequentially changed. The drive torque can be obtained in the following:

(Drive torque)=(Engine torque)×(Gear ratio)

Namely, the larger the gear ratio becomes, the larger the drive torque becomes. If the air/fuel ratio range of between 20 and 30 is fixedly selected, the gear ratio is selected so that a torque step will not develop. Assuming that the air/fuel ratio is 20 at a 1st speed, when a larger torque than that is required, the air/fuel ratio is further decreased. The required torque Tv is determined, for example, by the degree of opening of an accelerator. When the accelerator opening degree is large, the required torque Tv is large.

Figure 26:
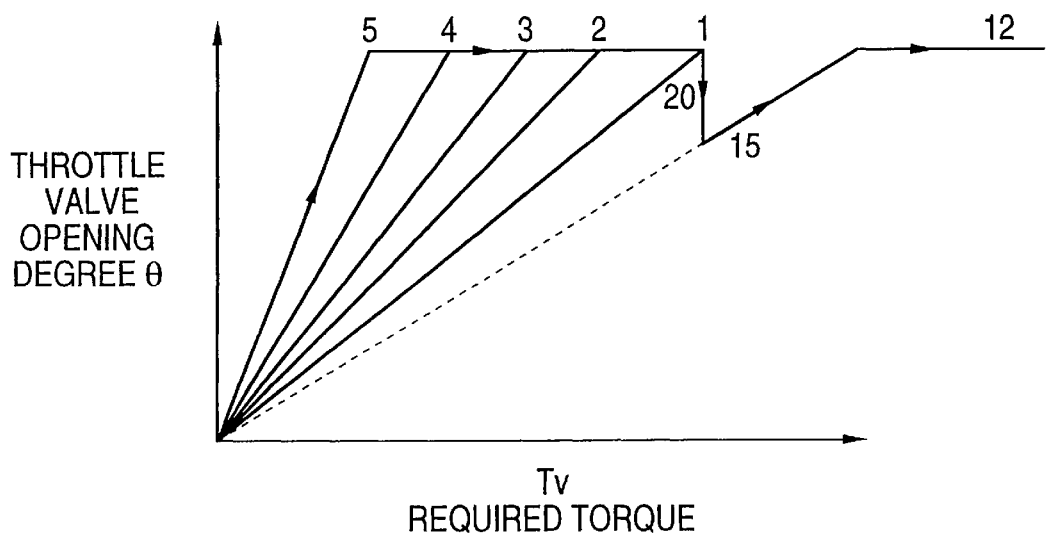
FIG. 26 is a diagram showing the correlation between a throttle valve opening degree and the required torque.

FIG. 26 shows the relation between the degree θ of opening of the throttle valve and the required torque Tv. When the required torque Tv is small, the throttle valve opening degree θ is decreased to reduce the engine torque. When the required torque becomes larger, the throttle valve opening degree θ is fully increased, and the gear ratio is sequentially changed. At the 1st speed, the air/fuel ratio is skipped in view of the amount of production of NOx, so that a torque step develops. Therefore, the throttle valve opening is controlled in a closing direction so as to minimize a torque step. The throttle valve opening degree is controlled by a motor or the like. Since the control of the throttle valve can be made only in the closing direction of the valve, the engine torque will not increase against the driver's will. It is preferred that the throttle valve be fully opened, but if the operation can be effected in the fully-opened condition because of the performance of the engine, the operation is effected, with the throttle valve opened as much as possible.

Figure 27:
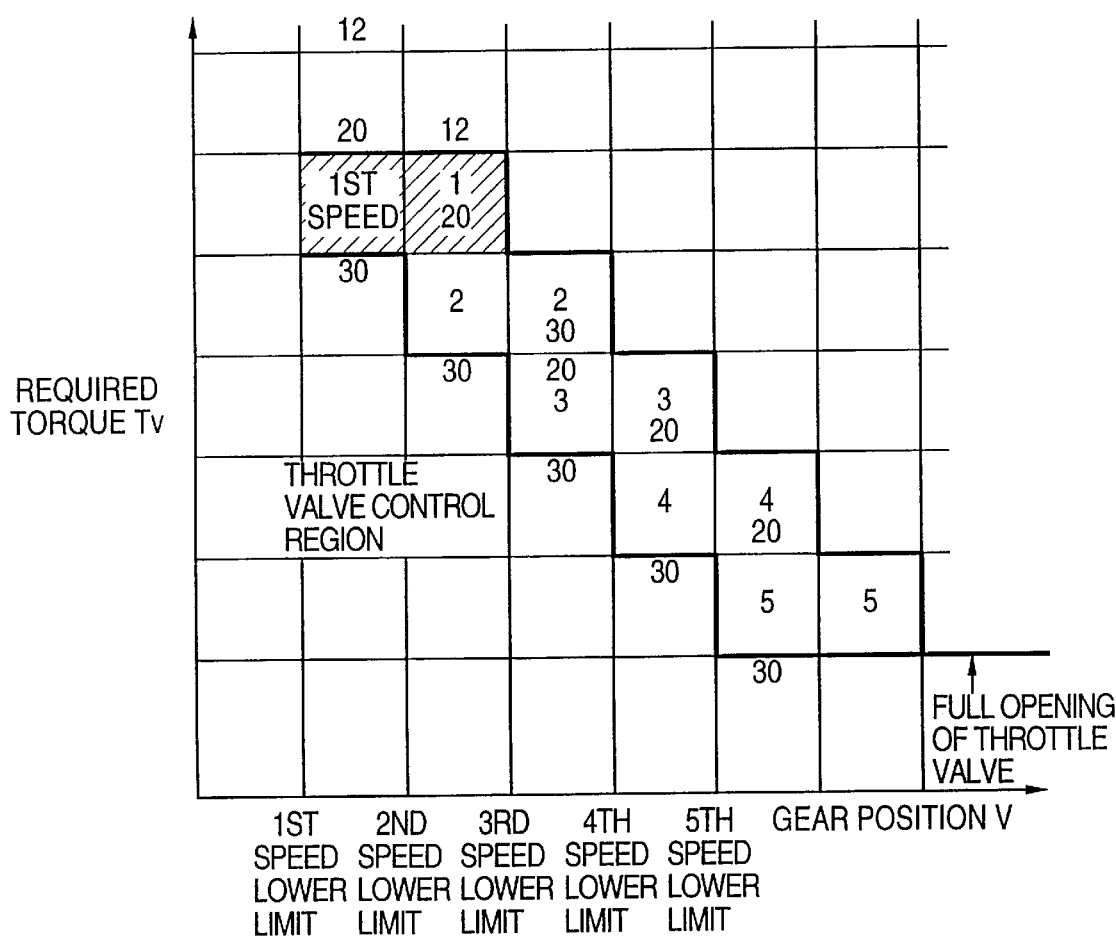
FIG. 27 is a diagram showing the correlation between the required drive torque and the gear position.

FIG. 27 shows the relation between the required torque Tv and the gear position V for the vehicle speed. The gear position V is changed in accordance with the vehicle speed. The gear position V is increased with the increase of the vehicle speed. When the gear position V is decreased, the drive torque can be increased. The description will be given with respect to an example in which the vehicle speed is increased from a low speed, with the throttle valve fully opened. When the vehicle speed increases from the 1st speed (1st gear) to the lower limit of the 2nd speed, the air/fuel ratio is changed from 30 to 20, thereby minimizing or avoiding a torque step. As the required torque decreases, the air/fuel ratio is changed from 20 to 30. When the vehicle speed further increases, the gear is changed to the 3rd speed, and at this time the air/fuel ratio is changed to 20, thereby avoiding a torque step. A similar operation is repeated until the 5th speed. When the required torque is to be changed at the 1st speed, the air/fuel ratio is brought into 30 in the fully-opened condition of the throttle valve. When the torque need to be further increased, the fuel amount is increased to change the air/fuel ratio to 20. When the torque is small, the throttle valve opening degree is reduced to decrease the air amount. When the air/fuel ratio is constant, the fuel amount decreases with the decrease of the air amount, so that the torque is reduced. When the required torque is small, but is larger than that of the lower limit vehicle speed of the 5th speed, the 5th speed is selected. When the vehicle speed is made lower than the lower limit vehicle speed of the 5th speed, the engine speed becomes too low. When at the 5th speed in the fully-opened condition, a larger torque is required than that obtained with the air/fuel ratio of 20, the 4th speed is selected if the vehicle speed is higher than the lower limit of the 4th speed. At this time, the air/fuel ratio is changed to 30, thereby avoiding a torque step. When at the 4th speed in the fully-opened condition, the torque is to be made smaller than that obtained with the air/fuel ratio of 30, the throttle valve is closed. Similarly, when the required torque is to be increased, the gear is changed to the 3rd speed. The torque is controlled by sequentially changing the gear to the 1st speed in a similar manner.

Figure 28:
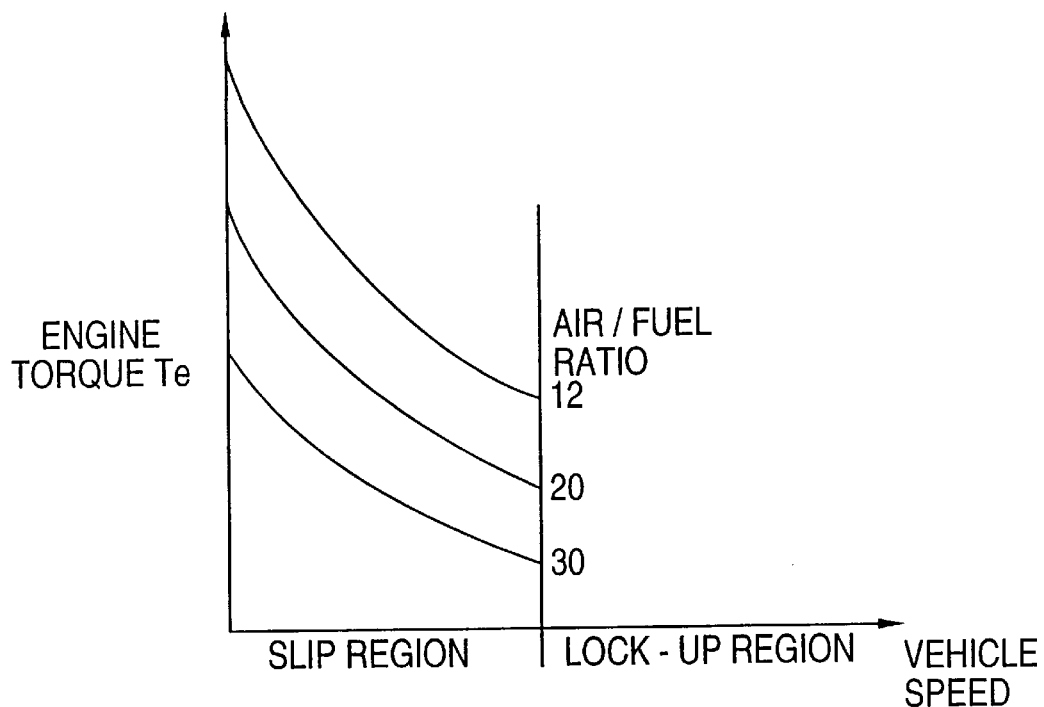
FIG. 28 is a diagram showing the correlation between a vehicle speed and the engine torque.

FIG. 28 shows the relation between the vehicle speed lower than the lower limit vehicle speed of the 1st speed and the engine torque Te at an outlet of a torque converter. Below the lower limit vehicle speed, when the transmission (gearbox) is kept in an engaged condition, the engine speed becomes too low, and in an extreme case, the engine is stopped. In such a speed region, a so-called lock-up (by which the transmission and the engine are directly connected together) is released, and the transmission is connected to the engine through the torque converter. When the vehicle speed decreases, there develops a slip region where there is a difference in rotational speed between the inlet and outlet of the torque converter. In the slip region, the torque is increased, and the engine torque at the outlet of the torque converter is increased. The engine torque can be changed by the air/fuel ratio. When the engine torque is, for example, not higher than 800 rpm, the lock-up is released. However, if the torque converter involves a slip, the torque converter produces a loss of transmission of the energy, so that the fuel consumption is worsened.

Figure 29:
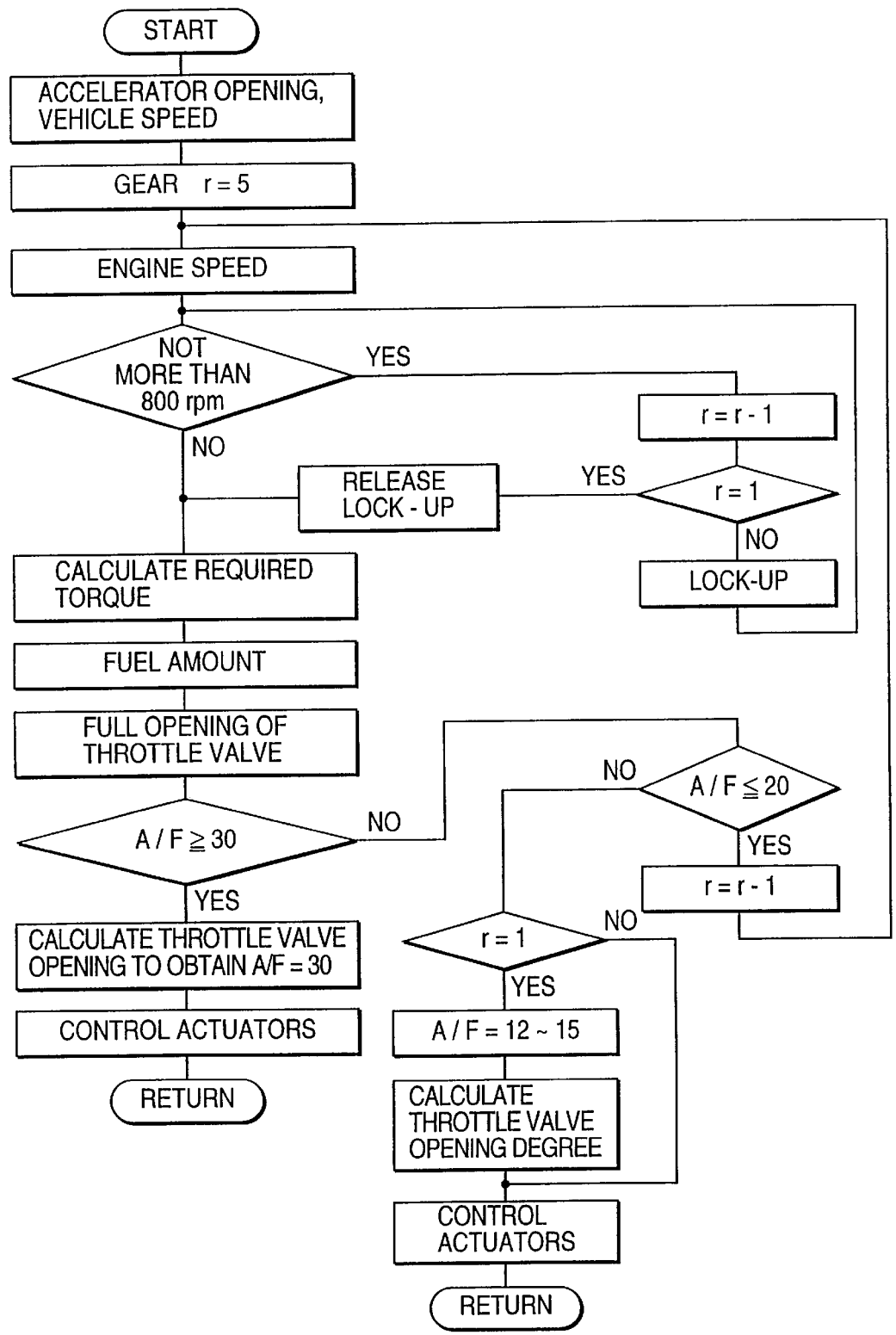
FIG. 29 is a flow chart for the control of a transmission and the engine.

FIG. 29 shows a flow chart of the control of the transmission and the engine. The engine speed is calculated from the accelerator opening degree and the vehicle speed where number of gear shift positions r=5. When the engine speed is, for example, not more than 800 rpm, the gear position is shifted down by one speed (one gear) so that the engine speed will not be below 800 rpm. In the flow chart, although the gear position is sequentially shifted down, the gear position may be determined in accordance with the minimum allowable engine speed and the vehicle speed. If the gear position is larger than the 1st speed (1st gear), the lock-up is effected. When the gear position is the 1st speed, the gear position can not be shifted down any further even if the engine speed is lower than the minimum allowable engine speed, and therefore the lock-up is released. After the gear position is determined, the required engine torque (required torque) for the drive torque required by the driver is calculated. The fuel amount is calculated from the required torque, and the air/fuel ratio when fully opening the throttle valve is calculated. If the air/fuel ratio is not less than 30, the combustion becomes unstable, and therefore the throttle valve opening degree is so determined by calculation that the air/fuel ratio becomes 30. The associated actuators (the fuel injection valve, the throttle valve and the transmission) are so controlled that the fuel amount, throttle valve opening degree and gear position thus determined can be obtained. On the other hand, if the air/fuel ratio is not more than 20, the gear position is determined as (r−1), and the engine speed is calculated again. At this time, the fuel amount is controlled not to produce a drive torque step. Also, when the gear position is the 1st speed (1st gear), the gear position can not be shifted down any further, and therefore the air/fuel ratio is changed from 12 to 15. Since the air/fuel ratio is skipped at this time so as to reduce the amount of discharge of NOx, the throttle valve opening degree is so determined by calculation that a drive torque step will not develop, and the actuators are controlled.

Figure 30:
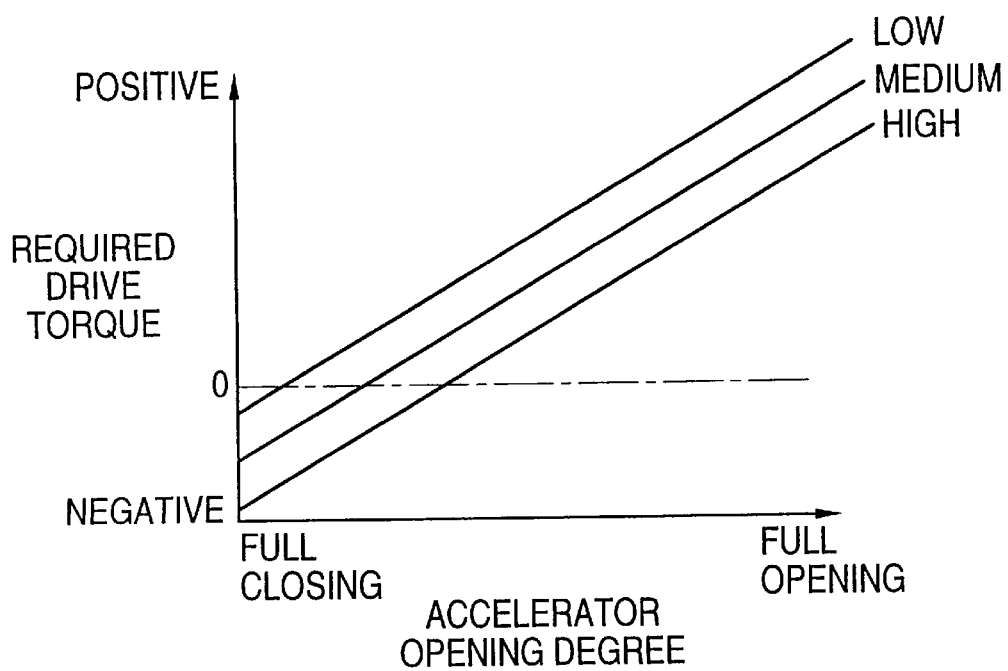
FIG. 30 is a diagram showing the correlation between an accelerator opening degree and the required drive torque.

FIG. 30 shows the relation between the accelerator opening degree and the required drive torque. As the accelerator opening degree decreases, the required drive torque is decreased. At the same accelerator opening degree, the required drive torque is decreased as the vehicle speed increases. That the required torque can have a negative value means an engine brake. At the same accelerator opening degree, the higher the vehicle speed is, the more effectively the engine brake acts.

Figure 31:
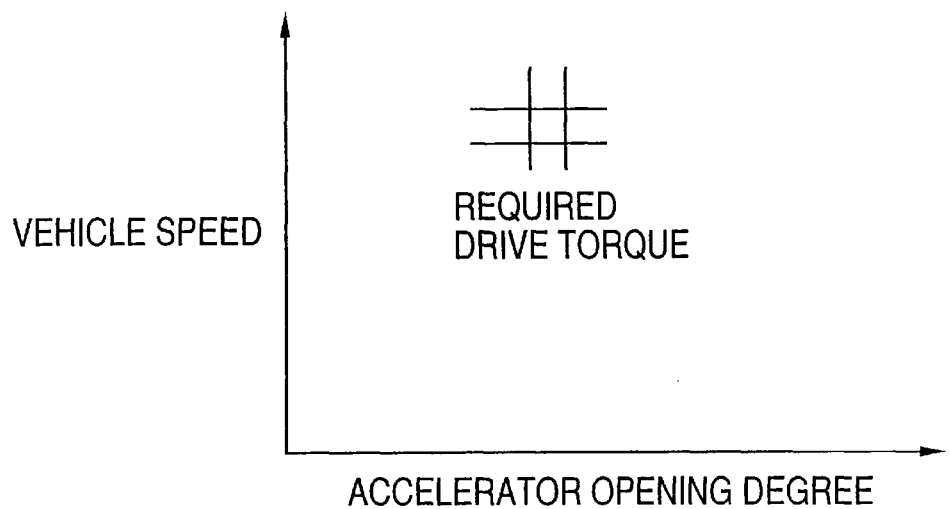
FIG. 31 is a diagram showing the correlation between the accelerator opening degree and the vehicle speed.

The required drive torque is determined for the accelerator opening degree and the vehicle speed, as shown in FIG. 31. These values are stored as a map in a memory of a computer for control purposes. For example, the accelerator opening degree, as well as the vehicle speed, is divided into 16, and 256 values of the required drive torque are stored.

Figure 32:
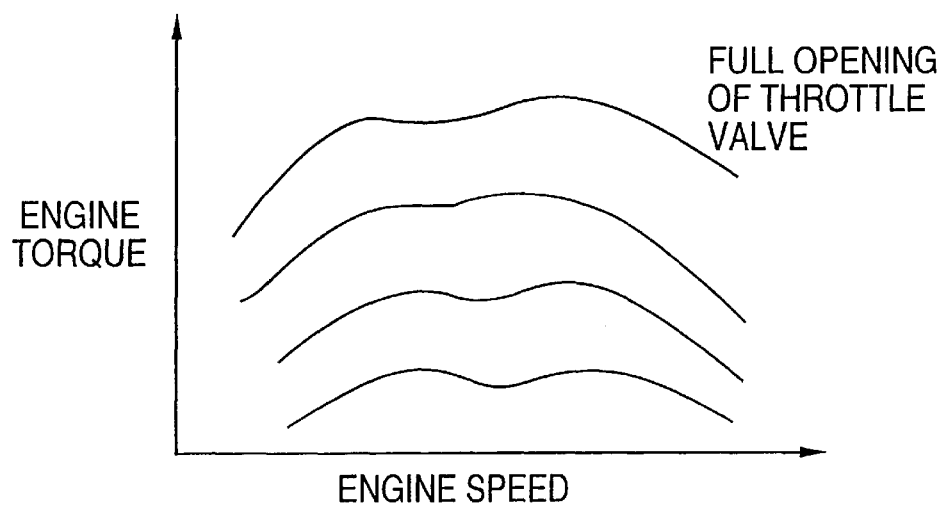
FIG. 32 is a diagram showing the correlation between the engine speed and the engine torque.

FIG. 32 shows the relation between the engine speed and the engine torque. At the same engine speed, the larger the throttle valve opening degree is, the larger the torque is. By controlling the throttle valve opening degree, the engine torque can be controlled. Also, since the engine torque varies depending on the air/fuel ratio, the torque is controlled by changing the throttle valve opening degree and the fuel amount.

Figure 33:
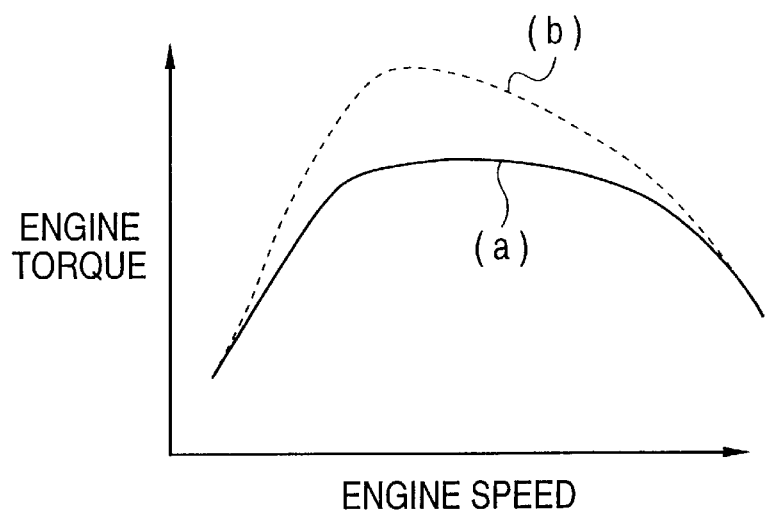
FIG. 33 is a diagram showing the correlation between the engine speed and the engine torque.

As to other advantageous effects of the present invention, the amount of the intake air is larger when using supercharging than when not using the supercharging, and the engine torque increases as shown in FIG. 33. If an exhaust turbo charger is used as the supercharging means, regardless of the driver's will, the torque characteristics with the supercharging are represented by a curve (a) while the torque characteristics without the supercharging are represented by a curve (b). Therefore, the engine output or power is abruptly increased when effecting the acceleration, and this gives a sense of difference or a feeling of physical disorder.

Figure 34:
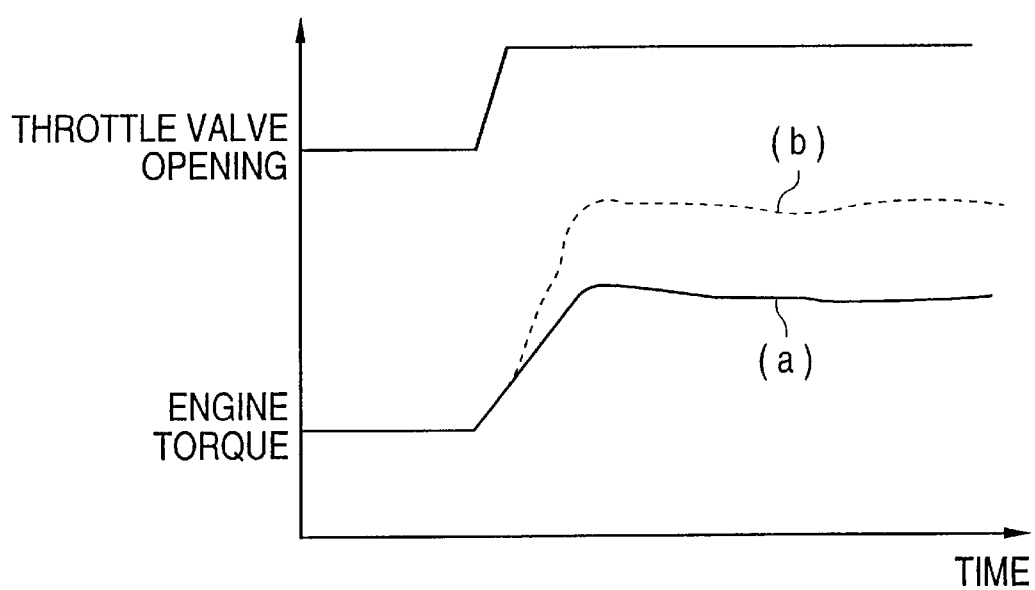
FIG. 34 is a time chart showing the change of the engine torque and the throttle valve opening degree with time.

FIG. 34 is a time chart showing the change of the engine torque and the throttle valve opening degree with time. When an accelerator pedal is pressed down, the amount of the air is increased, so that the fuel injection amount is increased. When the supercharging is effected, the air amount is abruptly increased, the torque is increased as shown by (b) of FIG. 34 regardless of the driver's will, and this gives the sense of difference. When the supercharging is not effected, the time-dependent change of the engine torque with respect to a time-dependent change of the throttle valve opening degree is represented by (a) in FIG. 34. Thus, a certain period of time is required because of the inertia force before the speed by the supercharging becomes high, and therefore the supercharging becomes effective halfway during the acceleration.

Figure 35:
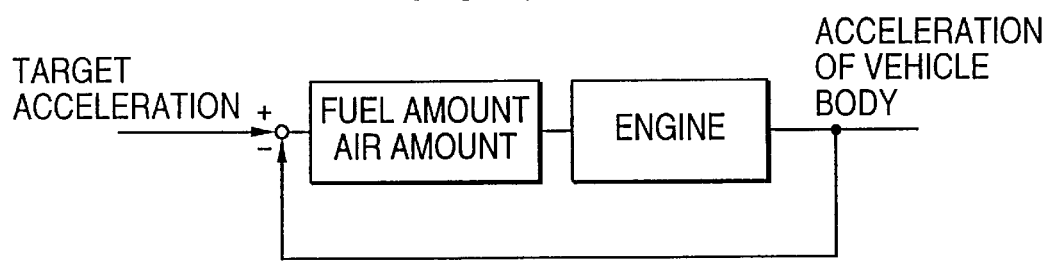
FIG. 35 is a control block diagram of still another embodiment of the invention.

FIG. 35 shows a control block diagram according to another embodiment of the present invention. The acceleration of the vehicle body is detected by an acceleration sensor, and if a desired drive torque is not obtained, the gear ratio (transmission ratio) of the engine is changed.

Figure 36:
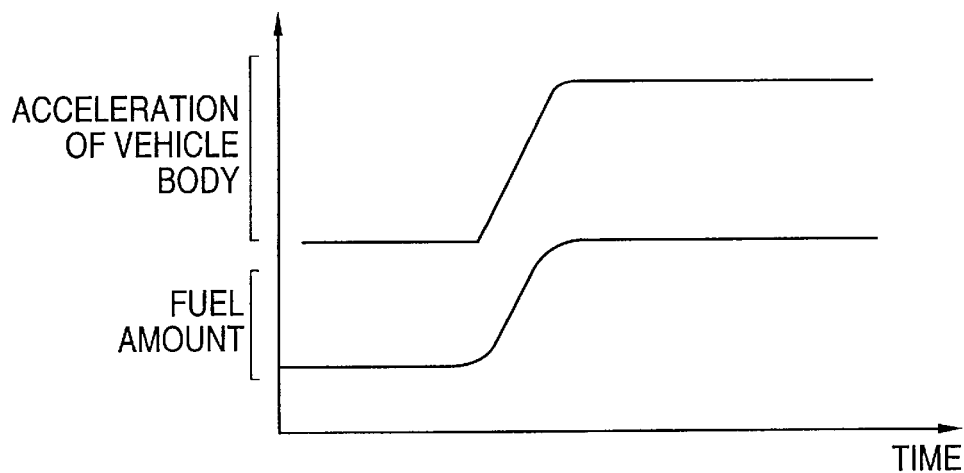
FIG. 36 is a time chart showing the change of the fuel amount and the vehicle acceleration with time.

FIG. 36 shows the change of the fuel amount and the vehicle body acceleration with time. In order to determine the target acceleration for the accelerator opening degree as shown in this Figure, the fuel amount is increased to increase the engine torque. In the injection within a cylinder, the fuel can be injected directly into the cylinder, and therefore the fuel will not deposit on an intake manifold and the like, and the torque can be controlled with a good response. The acceleration is detected, and the fuel amount is so controlled that the target acceleration can be achieved.

Figure 37:
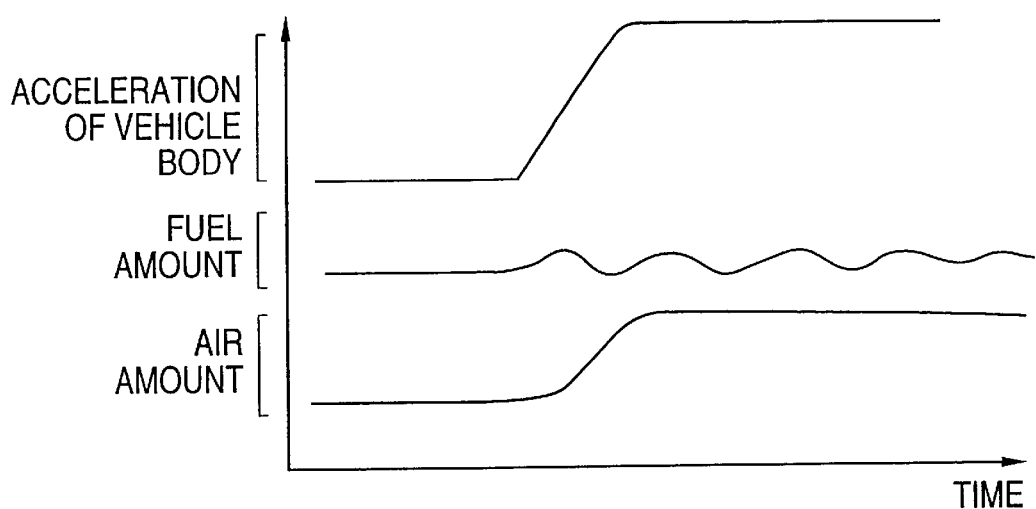
FIG. 37 is a time chart showing the change of the air amount, the fuel amount and the vehicle acceleration with time.

FIG. 37 shows the change of the intake air amount, the fuel amount and the vehicle body acceleration with time. In order to determine the target acceleration for the accelerator opening degree as shown in this Figure, the fuel amount and the intake air amount are increased to increase the engine torque. The intake air amount is controlled by the throttle valve opening degree, but a delay occurs due to a volume of an intake manifold, so that the torque can not be controlled in a good response. Therefore, a large change of the engine torque is controlled by the air amount, and the control for small variations is effected by the fuel amount. In such a control, the range of change of the air/fuel ratio can be narrowed, and also the engine torque can be controlled over a wide range.

In the present invention, since the throttle valve full-open region is much used, the engine brake is less liable to act effectively at the time of the deceleration. Therefore, at the time of the deceleration, the electric charger is operated, thereby effecting an electric charging control. By doing so, the engine brake is achieved at the time of the deceleration, and also the energy at the time of the deceleration can be recovered. With respect to the decelerated condition, for example, when an injection pulse Tp is not greater than a predetermined value Tpc, the throttle valve opening degree is not greater than a predetermined value, and the engine speed Ne is not less than a predetermined value, it is judged that the deceleration occurs, and the electric charging operation is effected. Also, when the accelerator opening degree is not lower than a predetermined value, the charging operation is effected regardless of whether or not the injection pulse is below the predetermined value. During the charging operation, the charging target voltage is increased to increase a charging load. Other load such as a fuel heater may be used as the charging load. When the throttle valve is used, the throttle valve is closed during the deceleration.

In the present invention, the combustion time is shortened, the knocking is prevented, the compression ratio of the engine is increased, the heat efficiency is enhanced, and the fuel consumption is enhanced. The production of unburned hydrocarbon can be prevented by the stratified intake. The response to the fuel is enhanced by the fuel injection within the cylinder. Without increasing the pumping loss, the engine output or power can be controlled in a good response, thereby enhancing the drivability.

What is claimed is:

1. An engine comprising
   an engine cylinder which is subjected to an air intake stage fuel injection and a compression stare fuel injection provided with an air intake valve through which air is supplied into said engine cylinder;
   an injector having a fuel injection port which port is directed towards an interior of said engine cylinder;
   a control unit connected to said air intake valve and to said injector,
   wherein said control unit changes an air intake amount by controlling an opening degree of said air intake valve, and controls an air/fuel ratio by changing an amount of fuel supplied by said injector; and
   an exhaust valve provided in said engine cylinder,
   wherein said control unit controls said intake valve and said exhaust valve so that an opening period of said intake valve is overlapped with an opening period of said exhaust valve at least when the opening period of said intake valve is maximum, and
   wherein the overlapped time in the compression stage fuel injection is longer than that in the air intake stage fuel injection.

2. An engine according to claim 1, wherein said control unit changes the opening degree of said air intake valve in a stepwise manner.

3. An engine according to claim 2, wherein said control unit changes the opening degree of said air intake valve in a three-stage manner.

4. An engine according to claim 1, wherein said control unit controls the opening degree of said air intake valve by controlling a degree of a lift of said air intake valve.

5. An engine according to claim 1, wherein said control unit controls an opening period of said air intake valve by controlling time of an opening signal thereto.

6. An engine according to claim 1, wherein said control unit controls an opening degree of said air intake valve by changing cams attached thereto.

7. An engine according to claim 1, wherein:
   said engine further comprises an air amount sensor, and
   said control unit detects an air amount by said air amount sensor to control the air amount to a target value thereof.

8. An engine according to claim 4, wherein:
   said engine further comprises an exhaust valve provided in said engine cylinder, and
   said control unit controls said intake valve and said exhaust valve so that an opening period of said intake valve is overlapped with an opening period of said exhaust valve at least when the lift of said intake valve is maximum.

9. An engine comprising:
   an engine cylinder provided with an air intake valve through which air is supplied into said engine cylinder;
   an injector having a fuel injection port which port is directed towards an interior of said engine cylinder;
   a control unit connected to said air intake valve and to said injector,
   wherein said control unit changes an air intake amount by controlling an opening degree of said air intake valve, and controls an air/fuel ratio by changing an amount of fuel supplied by said injector; and
   a throttle valve,
   wherein said control unit controls said throttle valve to decrease air intake amount when a required torque is small.

10. An engine according to claim 9, wherein said control unit changes the opening degree of said air intake valve in a stepwise manner.

11. An engine according to claim 9, wherein said control unit changes the opening degree of said air intake valve in a three-stage manner.

12. An engine according to claim 9, wherein said control unit controls the opening degree of said air intake valve by controlling a degree of a lift of said air intake valve.

13. An engine according to claim 9, wherein said control unit controls an opening period of said air intake valve by controlling time of an opening signal thereto.

14. An engine according to claim 13, wherein:

said engine further comprises an exhaust valve provided in said engine cylinder, and said control unit controls said intake valve and said exhaust valve so that an opening period of said intake valve is overlapped with an opening period of said exhaust valve at least when the time of the opening signal is maximum.

15. An engine according to claim 9, wherein said control unit controls an opening degree of said air intake valve by changing cams attached thereto.

16. An engine according to claim 9, wherein:

said engine further comprises an air amount sensor, and said control unit detects an air amount by said air amount sensor to control the air amount to a target value thereof.

17. An engine according to claim 9, wherein said control unit controls the opening degree of said air intake valve by controlling a degree of a lift of said air intake valve.

18. An engine comprising:

an engine cylinder provided with an air intake valve through which air is supplied into said engine cylinder;

an injector having a fuel injection port which port is directed towards an interior of said engine cylinder;

a control unit connected to said air intake valve and to said injector, wherein said control unit chances an air intake amount by controlling an opening degree of said air intake valve, and controls an air/fuel ratio by changing an amount of fuel supplied by said injector; and an exhaust valve provided in said engine cylinder, wherein said control unit controls said intake valve and said exhaust valve so that an opening period of said intake valve is overlapped with an opening period of said exhaust valve at least when the opening period of said intake valve is maximum, and wherein the period of the overlap in a high-output stage of the engine is longer than that in a low-output stage of the engine, said engine further comprises a throttle valve, and said control unit controls said throttle valve to decrease air intake amount when a required torque is small.

* * * * *